United States Patent [19]
Ashby et al.

[11] Patent Number: 5,305,384
[45] Date of Patent: * Apr. 19, 1994

[54] APPARATUS, SYSTEM AND METHOD FOR TRANSMITTING SECURE SIGNALS OVER NARROW SPACED CHANNELS

[75] Inventors: James C. Ashby, Priddy; Clark Burkhart, Azle; Frankie Favors, Bedford; Roy G. Tiemann, Priddy; Robert L. Vandaveer, Granbury; Lothar A. Krause, Irving, all of Tex.

[73] Assignee: Chips International, Inc., Priddy, Tex.

[ * ] Notice: The portion of the term of this patent subsequent to Sep. 22, 2009 has been disclaimed.

[21] Appl. No.: 942,661

[22] Filed: Sep. 9, 1992

Related U.S. Application Data

[63] Continuation-in-part of Ser. No. 621,476, Dec. 4, 1990, Pat. No. 5,150,401.

[51] Int. Cl.$^5$ .............................................. H04K 1/00
[52] U.S. Cl. ........................................ 380/29; 380/28; 380/31; 380/33
[58] Field of Search .................. 380/28, 29, 31, 33, 380/34, 38, 39, 40, 48, 49; 341/72

[56] References Cited

U.S. PATENT DOCUMENTS

| | | | |
|---|---|---|---|
| 4,167,700 | 9/1979 | Coe et al. | 380/48 X |
| 4,757,536 | 7/1988 | Szczutkowski et al. | 380/48 |
| 4,817,146 | 3/1989 | Szczutkowski et al. | 380/48 |
| 4,981,371 | 1/1991 | Gurak et al. | 380/49 |
| 5,007,050 | 4/1991 | Kasparian et al. | 380/49 X |
| 5,028,922 | 7/1991 | Huang | 341/72 X |
| 5,150,401 | 9/1992 | Ashby et al. | 380/29 |

*Primary Examiner*—Tod R. Swann
*Attorney, Agent, or Firm*—Daffer & Associates

[57] ABSTRACT

An encryption/decryption device, system and method for providing secure communication over a communication channel. The encryption device includes a radio interface unit connected to a conventional radio, wherein the interface unit selectively couples a codec, signal processor and modem to the transmit and receive path during secure operation. The codec digitally encodes non-secure analog signals and places them in pulse code modulated format. The signal processor then compresses the pulse code modulated signals into voice coded and then digitally encrypted NRZ signals which are then input into the conventional radio for modulating a carrier frequency on an occupied bandwidth approved for 15 KHz to 25 KHz, or as little as 11.4 KHz, spaced channels. The modem can input the digitally encrypted signals using modified frequency modulation to place the modified digitally encrypted signals substantially within the voice passband of 300 Hz to 3200 Hz. The device, system and method incorporates a master prologue sent prior to voice information at a BPS rate different from that of the voice BPS rate. The voice information is sent in blocks with a plurality of resynchronization data frames of bits interlaced between a plurality of voice frames of bits to allow highly reliable late entry and re-entry access. A conventional repeater system can be selectively controlled by a controller device of the present invention for demodulating, error correcting and recompressing the master prologue without descrambling the digitally encoded voice information.

27 Claims, 13 Drawing Sheets

Figure 6:
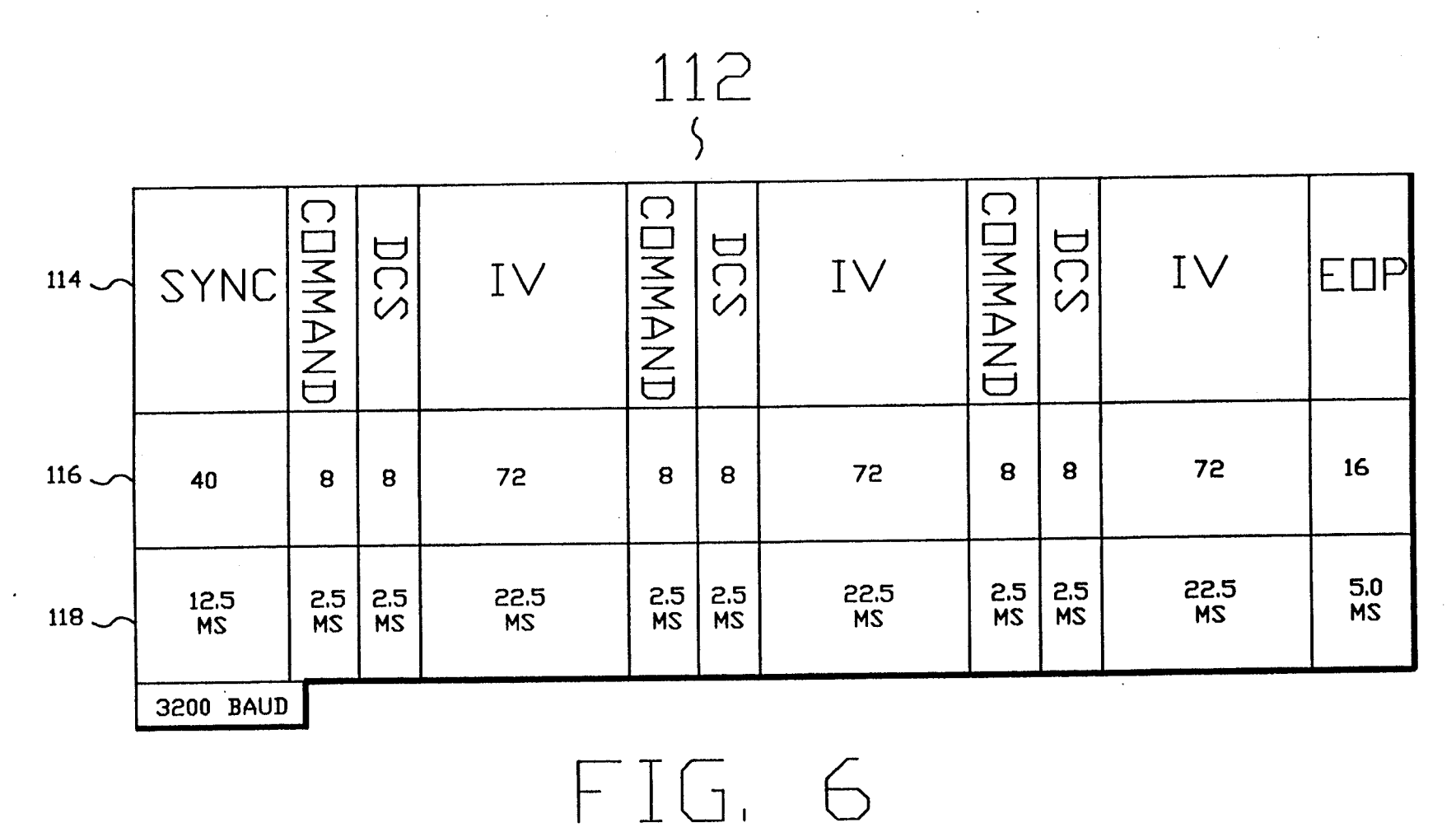

| 114 | 116 | 118 |
|---|---|---|
| SYNC | 40 | 12.5 MS |
| COMMAND | 8 | 2.5 MS |
| DCS | 8 | 2.5 MS |
| IV | 72 | 22.5 MS |
| COMMAND | 8 | 2.5 MS |
| DCS | 8 | 2.5 MS |
| IV | 72 | 22.5 MS |
| COMMAND | 8 | 2.5 MS |
| DCS | 8 | 2.5 MS |
| IV | 72 | 22.5 MS |
| EOP | 16 | 5.0 MS |
| 3200 BAUD | | |

| SSYNC | COMMAND | ADDRESS ANI | ADDRESS ANI | SSYNC | COMMAND | ADDRESS | ADDRESS ANI | DATA BURST | SEOT |
|---|---|---|---|---|---|---|---|---|---|
| 64 | 32 | 72 | 72 | 64 | 32 | 72 | 72 | 256 | 16 |
| 20 MS | 10 MS | 22.5 MS | 22.5 MS | 20 MS | 10 MS | 22.5 MS | 22.5 MS | 80 MS | 5 MS |

3200 BAUD

212

214 — SSYNC column
216 — 64 row
218 — 20 MS row

FIG. 8

1. +5 VOLTS
2. TX DATA
3. RX DATA
4. RTS
5. CTS
6. DSR
7. GROUND
8. DCD
9. SECURE DETECTED

FIG. 9

| NUMBER | BLOCK | FUNCTION |
| --- | --- | --- |
| 000 | MASTER | SPEED SELECT |
| 001 | SECONDARY | SET MASTER KEY DATA |
| 002 | SECONDARY | SET DCS CODES |
| 003 | SECONDARY | RESPONSE REQUEST |
| 004 | SECONDARY | RESPONSE STATUS REQUEST |
| 005 | SECONDARY | KILL MAIN MEMORY (BIOS) |
| 006 | SECONDARY | ENTER NEW BASE CALL ADDRESS |
| 007 | SECONDARY | RESPONSE RETURN |
| 008 | SECONDARY | RESPONSE STATUS RETURN |
| . | . | . |
| . | . | . |
| 249 | SECONDARY | TALK AND RUN SEQUENCE (AUTOMATIC) |
| 250 | SECONDARY | AUX DATA TRANSFER |
| 251 | SECONDARY | VOICE MAIL DATA (NON-REALTIME) |
| 252 | N/U | N/U |
| 253 | N/U | N/U |
| 254 | SECONDARY | HAND OFF TO MODULATOR/DEMODULATOR #2 |
| 255 | SECONDARY | END OF TRANSMISSION (EOT) |

FIG. 10

APPARATUS, SYSTEM AND METHOD FOR TRANSMITTING SECURE SIGNALS OVER NARROW SPACED CHANNELS

This application is a continuation-in-part of application Ser. No. 07/621,476, filed Dec. 4, 1990, now U.S. Pat. No. 5,150,401.

BACKGROUND OF THE INVENTION

1. Field of the Invention

The present invention relates to the art of cryptography and, more specifically, to the implementation of improved techniques for achieving voice and/or data communication security over a radio and/or telephone channel.

2. Description of the Relevant Art

Cryptography generally relates to the art of protecting sensitive communications against unauthorized access. The proliferation of electronic eavesdropping into sensitive police and military communications has spurred industry to create encryption/decryption devices which prevent such eavesdropping.

Techniques of encrypting or scrambling of radio or telephone signals can take on many forms. Scrambling can go from simple analog encryption to sophisticated digital encryption. Analog scrambling, which makes use of filtering schemes, inverting schemes, time domain schemes and split-band audio schemes is generally easier to incorporate into the radio communication channel than digital scrambling, however, it is much easier for unauthorized users to unscramble an analog-scrambled voice than it is for them to unscramble digital-scrambled voice. Digital encryption, is more difficult to unscramble since it converts the voice to binary bits, scrambles the bits, then transmits the scrambled bits over the communication channel. Thus, the digital system makes unauthorized descrambling or deciphering difficult since all the intruding user "sees" is scrambled bit representation of voice and not scrambled voice itself.

Generally, the three functional blocks used in a digital speech encryption device are: (1) voice coder/decoder (vocoder); (2) encryption/decryption algorithm; and (3) modulation/demodulation methodology. The vocoder functions by first coding analog voice samples and then compressing those samples into a smaller number of binary bits. Thus, when combined with a suitable modulation methodology, the vocoder allows transmission over a communication channel of a smaller, specified bandwidth, and provides intelligible reproduction or decoding via the decode block on the receive end.

First generation vocoders were linear predictive coders (LPC-10) as discussed in *Federal Information Processing Standards Publication* (FIPS PUB) No. 137, U.S. Dept. of Commerce, NTIS, 5285 Post Royal Road, Springfield, Va. 22161, published on Nov. 28, 1984. The relatively poor voice quality reproduced by LPC coders spurred the industry to develop other vocoders, such as: (1) continuously variable slope delta (CVSD) modulation, described in U.S. Pat. No. 4,167,700, (2) sub-band coding described in T. P. Barnwell et al., "A Real-Time Speech Sub-Band Coder Using the TMS 32010," IEEE Southcon, (1984), and (3) hybrid sub-band coders described in U.S. Pat. No. 4,817,146.

Most of the recently developed vocoders known in the industry are described in "An Evaluation of 4800 BPS Voice Coders" Proceedings of ICASSP (1989). Such vocoders include Vector Adaptive Predictive Coder (VAPC) and Code or Vector Sum Excited Linear Predictive (CELP or VSELP) type coders. Other recent vocoders include Improved Multi-Band Excitation (IMBE) voice coders as described in Proceedings of ICASSP, (1990) and in U.S. Pat. No. 5,081,681 (herein incorporated by reference), and Sinusoidal Transform Coder (STC), as described in U.S. Pat. Nos. 4,885,790 and 4,937,873 (herein incorporated by reference). In addition, there are some very low bit rate (BPS) laboratory voice coders being developed. An exemplary said voice coder is described in Y. J. Liu, "A High Quality Speech Coder at 600 BPS," *Proceedings of ICASSP* (1990), pp 645–648.

Although vocoders of the conventional art can be adequately interfaced with many different and suitable modulation methodologies depending upon the channel characteristics, typical vocoders must transmit large numbers of bits per second (BPS), and/or utilize sophisticated forward error correction/detection techniques in order to achieve commercial quality voice reproduction. As defined herein "commercial quality voice reproduction" is reproduction which is considered equal to or near equal to the original analog voice normally reproduced through the communication channel. For example, CVSD requires 12,000 BPS while sub-band coding and hybrid sub-band coding requires approximately 9,600 BPS to reproduce commercial quality voice through radios. CELP type vocoders require 4,800 BPS and the IMBE and STC vocoders generally require 2,400 BPS to achieve commercial quality voice reproduction through radios.

Conventional vocoders typically reproduce commercial quality voice in the 0 to 1% bit error rate (BER) condition. With forward error correction, conventional vocoders typically reproduce intelligible voice up to the 5% to 8% BER condition. Thus, the vocoder BPS rates described above do not include the forward error correction/detection required to correct for a constantly varying BER of 0% to 10% encountered in land mobile radio channels (i.e., channels subject to fading and multipath conditions). Typical forward error correction methods such as cycle redundancy checks, parity checks, matrix extraction, bit averaging, Hamming coding, Golay coding, and soft decision, generally require additional or redundant bits be transmitted to ensure data integrity at the receive end. Other methods to help intelligibly receive data include bit interleaving, block or convolution coding.

Forward error correction techniques often require an additional 25–100% BPS be transmitted depending upon the vocoder, with the recent vocoders (i.e., VAPC, CELP, VSELP, IMBE and STC) requiring higher redundancy because of the increased importance of each bit transmitted. While a 10% to 25% redundancy is generally appropriate for a sub-band coder method, a 30% to 100% redundancy is often required for many of the recently developed vocoders described above. Thus, for example, the actual vocoder data rate required for a 2,400 BPS vocoder may be approximately 3,600 to 4,800 BPS in order to operate intelligibly in a land mobile radio. When system overhead is included, such as system synchronization, commands, and encryption initialization, the actual transmitted data rate may be over twice the actual vocoder rate.

The next functional block, or encryption/decryption block, is generally designed either to protect classified information or to protect sensitive but unclassified information. One conventional encryption technique used to prevent eavesdropping of sensitive but unclassified information is the Data Encryption Standard (DES). DES has become the standard algorithm used for sensitive, non-military applications such as, e.g., police communication. DES is fully explained in FIPS Pub No. 46, U.S. Dept. of Commerce, NTIS, 5285 Post Royal road, Springfield, Va. 22161, published on Jan. 22, 1988.

Typically, digital signals are processed in non-return-to-zero (NRZ) format. NRZ, as well as other formats, are often not reliable over communication channels. Thus, the third functional block, comprising the modulation/demodulation methodology, is needed. Modulation/demodulation methodologies are known in the art and can be described in M. Schwartz, *Information, Transmission, Modulation and Noise*, McGraw Hill, (3rd Edition, 1980); Ferrel G. Stremler, *Introduction to Communication Systems*, Addison-Wesley Publishing Company, Inc., (2nd Edition, 1982); I. Korn, *Digital Communications*, Van Nostrand Reinhold Company, Inc., (1st Edition, 1985); and J. Proakis, *Digital Communications*, McGraw Hill, (2nd Edition, 1989). It is important when modulating or demodulating in a communication path, that efficient use be made of the frequency spectrum. As generally utilized for conventional and trunked radios, constant envelope modulation techniques, such as frequency shift keying (FSK), or phase shift keying (PSK), may often cause the communication medium to occupy too wide a transmitted bandwidth for the governmental standard of 15 KHz to 25 KHz spaced radio channels. Also, the transmitted frequency components representing the digitally encrypted signals generally exceed the voice passband of 300–3200 Hz required in conventional radio and telephone systems when operating at the required data rates/hertz for digital secure voice communications.

To aid in the discussion and understanding of the present art, the following terms are defined herein: "conventional radios" are defined as frequency modulated (FM) and phase modulated (PM) analog radios that may contain nonlinear amplifiers and designed for 15 to 25 KHz spaced radio channels as defined in FCC Rules and Regulations Part 90, dated Feb. 15, 1989. Conventional radios may include trunked radios used in a trunked group as defined in FCC Rules and Regulations Part 90, dated Feb. 15, 1989. "15 KHz to 25 KHz spaced radio channels" refer to the separation between the center carrier frequency, measured in Kilohertz (KHz), of each radio channel as designated and listed in FCC Rules and Regulations Part 90, dated Feb. 15, 1989. "Linear Amplifier" is defined as a radio final amplifier, wherein the output is linearly proportional to the input. Generally, a signal requiring a linear amplifier will not work properly with a linearized or nonlinear amplifier. A linear amplifier is generally regarded as an FCC class A amplifier. "Linearized Amplifier" is defined as a radio final amplifier, wherein the output is mostly linearly proportional to the input. Generally, a signal requiring a linearized amplifier will also work properly with a linear amplifier, but not with a nonlinear amplifier. A linearized amplifier is generally regarded as an FCC class AB amplifier. "Nonlinear Amplifier" is defined as a radio final amplifier, wherein the output is not linearly proportional to the input. Generally, a signal that will work properly with a nonlinear amplifier will also work properly with a linear or linearized amplifier. A nonlinear amplifier is generally regarded as an FCC class C amplifier. "Conventional Repeater" is defined as a conventional radio that is used to expand the coverage by receiving and re-transmitting the signal to a satellite receiver, or receivers.

The industry has increased non-linear modulation efficiency using continuous phase modulation techniques, such as continuous phase frequency shift keying (CPFSK) including minimum shift keying (MSK) that have produced bandwidth efficiencies of up to 2 bits/Hz. However, one of the most popular and bandwidth efficient of these methods, MSK, requires a minimum separation of the transmitted frequencies that equals one-half of the BPS rate. Thus, for conventional digital encryption techniques employing MSK and requiring 9,600 BPS, as described in U.S. Pat. No. 4,817,146, a frequency separation of 4,800 Hz is needed thereby requiring frequency components of 2,400 Hz and 7,200 Hz be transmitted. It is believed that this constant frequency separation or shift of 4,800 Hz may exceed the design of some conventional phase modulated radios. An additional problem associated with conventional digital voice encryption modulation techniques is that they often require linearized response amplifiers and filters. Such is the case in U.S. Pat. No. 4,167,700 which describes an improved repeater which contains a "regeneration" means for retiming and reshaping the signal at remote locations without descrambling the signal. This method requires compatibility with linearized amplifiers and thus is not applicable to conventional radios and repeaters. Any of the above reasons, or others, may force consumers to dispose of their conventional radio equipment, including associated repeaters, and purchase new radio systems (i.e., radio equipment and repeaters) in order to use digital encryption/decryption with their radios.

As stated above and discussed in U.S. Pat. No. 4,852,166, another problem that typically arises in conventional digital voice encryption devices is that the transmitted BPS rates require transmission of frequency components that exceed the voice pass-band of 3200 Hz (approximately 300 to 3,200 Hz) specified by the FCC for conventional and trunked analog radio and telephone systems. One such system is described in U.S. Pat. No. 4,817,146. Patent '146 specifies a fairly high transmitted frequency component of approximately 7200 Hz. To compensate for the transmitted high frequencies, a low pass filter is modified or bypassed in the radios and the level of modulation deviation is often lowered to remain within the approved occupied bandwidth of 15 KHz to 25 KHz spaced channels. Oftentimes, lowering the modulation deviation results in a reduction of transmitter efficiency. To compensate for a loss of transmitter efficiency, radio transmitter power must generally be boosted. As shown in the FCC Rules and Regulations, Title 47 Code of Federal Regulations (CFR) Part 22.508 dated Oct. 1, 1988, a low-pass filter is required before the modulator in a conventional and trunked radio that attenuates audio frequency components above the voice pass-band from 3 KHz to 15 KHz by at least a scale of $40 \log_{10} (f/3)$ decibels (db) where "f" is the audio frequency in KHz. Thus, the digital encryption device described in Patent '146 (which transmits a 7200 Hz high frequency component), must modify or bypass this low-pass filter because the transmitted signal strength (power) of the high frequency component would be attenuated by approximately 15 db below the low frequency component (i.e., 2400 Hz). This would result in a conventional radio only transmitting the high frequency component at a power level substantially equal to 1/32nd of the low frequency component transmitted power, rendering the device virtually useless.

Also, as discussed in the FCC Rules and Regulations Part 2.202 dated Oct. 1, 1987 and Part 22.507 dated Oct. 1, 1988, the formula to calculate the necessary bandwidth occupied by a typical FM radio emission is $B_n = 2M + 2DK$, wherein:

$B_n$ = necessary bandwidth in hertz.

M = maximum modulation frequency in hertz.

D = peak frequency deviation, i.e. half the difference between the maximum and minimum values of the instantaneous frequency (i.e., instantaneous frequency in hertz is the time rate of change in phase in radians divided by two)

K = an overall numerical factor which varies according to the emission and which depends upon the allowable signal distortion: K = 1 for typical FM Radio.

The maximum occupied bandwidth for the digital encryption apparatus described in Patent '146 when transmitting a 7200 Hz frequency component is calculated as, M = 7200 (highest frequency) and D = maximum 10000/2 Hz, or 5 KHz as described in Part 22.507 above, the maximum occupied bandwidth could be:

$B_n = 2(7200 \text{ Hz}) + 2(10000 \text{ Hz}/2)(1)$ $B_n = 14400 \text{ Hz} + 10000 \text{ Hz}$ $B_n = 24400 \text{ Hz}$ or 24.4 KHz By lowering the peak deviation (D) to 5000 Hz, which is believed to be the lowest peak deviation that will provide satisfactory results (+/−2.5 KHz), the necessary occupied bandwidth should be:

$B_n = 2(7200 \text{ Hz}) + 2(5000 \text{ Hz}/2)(1)$ $B_n = 14400 \text{ Hz} + 5000 \text{ Hz}$ $B_n + 19400 \text{ Hz}$ or 19.4 KHz Thus, the occupied bandwidth of the device described in Patent '146 should fall within the allowable 20 KHz for digital voice transmissions on 15 KHz to 25 KHz spaced channels if the peak deviation is substantially lowered from the maximum 5 KHz allowed.

The FCC Rules and Regulations concerning occupied bandwidth, frequency deviation, voice pass band and resulting radio designations are fully explained in Title 47, Code of Federal Regulations (CFR) Parts 2, 22, and 90 available at the U.S. government printing office.

New digital radio standards are currently being developed by both the U.S. government (Federal Standard 1024) and the public safety community (e.g., Associated Public Safety Communication Officers, Inc. (APCO) Project 25) to achieve increased spectrum efficiency. The new standards may ultimately narrow the channel spacing in a portion of the spectrum to about 6.25 KHz, versus the current 15 KHz to 25 KHz spacing. Examples of modulation methodologies that are being considered to obtain this efficiency are 4-ary FSK, generalized tamed frequency modulation (GTFM), quadrature differential phase shift keying (QDPSK), pi/4 shift QDPSK, C4FM, and QPSK-compatible (QPSK-C). These modulation techniques have not achieved the 6.25 KHz efficiency when designed into conventional radio transmitters without wholesale redesign of the radio itself. It is believed that there are currently no plans or discussions underway that will allow conventional radios to be forward compatible to the new digital radios in the new digital mode, regardless of the occupied bandwidth required by older conventional radios.

As explained above, digital voice coders typically used in digital voice encryption applications remain intelligible in the BER condition. That is, the voice typically remains intelligible even though the received information contains wrong information (i.e., bit errors) in the range of 0% to 8%. However, it is also commonly known that the critical control information must be interpreted correctly, i.e., interpreted error-free by the receive unit in order for the voice to be decrypted properly. Critical control information typically includes system synchronization, encryption initialization, a method of identifying the encryption code key used and a method of identifying units authorized to receive the information.

Typical digital transmission methods of the prior art use either asynchronous methods or synchronous methods at a fixed speed. The fixed speed means the BER condition for the critical control information is the same as the voice information since both blocks are sent at the same speed. However, only the control information must be interpreted error-free. Asynchronous methods include the synchronization bits within the data bits. Synchronous methods separate the synchronization bits from the data bits. However, when a fixed speed is utilized, the device then becomes limited to only the application for which it was designed. A recent application of the new digital radios suggests combining both voice and data into the same bit stream at a fixed speed, but this application has not been shown to be suitable with conventional radios.

Generally, to ensure correct reception when using synchronous techniques, the critical control information is redundantly transmitted such that each subblock of information (e.g., encryption initialization or re-initialization subblocks) is repeated several times whenever the critical control information is transmitted. Also, the entire critical control information block is repeatedly transmitted as often as possible, often more than twice per second, to ensure the receiving units remain in synchronization throughout the message. Retransmitting the critical control information throughout the message also allows those units that are lost to "enter the conversation late" and decrypt the remainder of the message. This is commonly known as "late entry". Also, retransmitting the critical control information throughout the message allows the message to be more secure by continuously re-initializing and changing the encryption mapping via transmission of new encryption initialization vectors (IV).

Redundant transmission of the critical control information is necessary to compensate for the fading and multipath effects associated with land mobile radio channels. These effects, known as Rayleigh fading to those skilled in the art, cause the transmitted signal to fade by an average of −20 db (decibels) for an average length of 45 milliseconds (ms) per occurrence. Also, as the carrier frequency band increases, the occurrence of fades per second increases which typically results in comparatively poorer system reliability at frequency bands such as 800 MHz to 900 MHz versus 150 MHz to 450 MHz.

A conventional digital encryption device that uses synchronous methods is described in U.S. Pat. No. 4,757,536. Patent '536 utilizes a fixed speed and a very redundant "preamble" data format for transmitting the initial critical control information. This redundant preamble cannot be repeated throughout the message without losing a large portion of the transmitted voice data, or without allowing for a late entry so infrequently as to be deemed virtually useless. Thus, subsequent re-synchronization, encryption re-initialization and other control information that allows for late entry in this method is transmitted as header information only once per data frame and thereby is not as reliable as the initial preamble. Where the long preamble format virtually assures reliable initial synchronization at the beginning of a message, one error during the re-initialization of the encryption subsequently transmitted during the same message causes the receiving unit to lose encryption synchronization, or go into a "coast" condition. As described in Patent '536, the "coast" condition occurs whenever a transmitting or receiving unit has previously received control information properly (i.e., attained a steady state) and has subsequently detected an error during re-initialization of the encryption process. The "coast" condition allows the receiving unit to then predict the correct IV and continue decrypting the message.

As taught in our co-pending parent application Ser. No. 07/621,476, a dynamic speed change can be designed to occur between the master prologue (control information) and a subsequent voice or slave prologue (voice block or secondary command/data block) depending upon the command word in the master prologue. The method of application Ser. No. 07/621,476 allows for the control information to be sent at a slower BPS to reduce the BER condition during transmission of the critical control information and allows the BPS to change as required for transmission of the appropriate voice or data information. When comparing the lower versus higher BPS rates for the same BER condition, informal tests have shown the higher BPS rates require a received signal strength of 3 db to 6 db greater than the lower BPS rates, depending upon the actual BPS rates being tested. As such, lower BPS rates provide more accurate transmission reliability. Informal tests have shown a 3 to 6 db improvement in the signal to noise ratio for the same BER condition depending upon the actual BPS rates being tested. As is readily appreciated, data applications, such as information transmitted by data terminal equipment (DTE) must also be interpreted error-free in order to use the information. Most data applications through conventional radios transmit the data in packet format, wherein the same packet of information is repeated until the receive unit responds that the packet was received correctly. The command word as taught in application Ser. No. 07/621,476 instructs the transmitter and receiver to remain at a slow speed for packet transfers of data information.

Approximately 14 million U.S. consumers have conventional radios and repeater equipment approved for the standard 15 KHz to 25 KHz spaced channels, most of which are not presently capable of being converted to include digital encryption capability. While many conventional radios have been produced for foreign countries using 12.5 KHz spaced channels, such conventional radios lack retrofittability with digital encryption techniques described herein. If the foreign format radios could be retrofitted with digital encryption, then greater bandwidth efficiency in both secure and nonsecure modes could be achieved thereby providing a transition to the new narrow band digital radio standards using existing equipment. If the end user wishes to transmit data, as well as voice, conventional digital encryption devices cannot automatically transmit and receive secure signals at different data and voice transmission rates and/or data frame lengths. Nor can conventional devices permit the user to alternatively send a secure message through a DTE such as a keyboard, etc., or send a secure voice message at a slower speed for playback at the receiver at full speed.

Thus, a substantial need exists for an encryption/decryption device which can be retrofitted into existing off-the-shelf conventional radios. It also would be advantageous for the device to include re-synchronization capability with the same reliability as the initial synchronization and be capable of inputting into the conventional and trunked radio both control and encrypted voice data within the voice passband of approximately 300–3,200 Hz. Furthermore, if the device can send and receive secure information at varying BPS, the device would not be limited to only one application (i.e., voice or data). It would also be advantageous to provide a control and correction technique that can be designed into or retrofitted into conventional repeaters that controls the repeater functions during digitally encrypted transmissions and error-corrects the critical control information without descrambling the encrypted information. A need also exists for a method and device that can substantially narrow the necessary occupied bandwith below the 15 KHz to 25 KHz spaced channels while being able to use a nonlinear amplifier. Also, a need exists to provide a device which provides forward compatibility of conventional and trunked radios to the new federal standard 1024 and ApCO project 25 digital radio standards in the digital mode.

SUMMARY OF THE INVENTION

The problems outlined above are solved in large part by the device and method of the present invention. That is, an improved digital encryption device and method hereof is connected to or retrofittable with or into existing conventional radios to provide commercial quality voice reproduction at the receive end. The present device and method also provides for ongoing resynchronization and late entry reliability to be equal to initial synchronization reliability. The unique format also provides for a re-entry during data frames, in addition to a late entry.

Still further, the preferred encoding or modulating technique of the present invention places all of the transmitted information substantially within the 300 to 3,200 Hz voice passband. The present invention may further transmit and receive control information at one BPS rate, and transmit and receive subject matter, such as voice or data information, at the same, higher or lower BPS rate.

Even still further, the present invention utilizes a recent vocoder, such as VAPC, CELP, VSELP, IMBE or STC with appropriate forward error correction and bit redundancy techniques, preferably combined an encryption/decryption algorithm such as DES. The present device and method can be designed within or retrofittable to existing conventional radios by adding a suitable constant envelope modulation technique. A preferred modulation technique includes, but is not limited to, continuous phase modulation (i.e., CPFSK) or a baseband modulation technique known as modified frequency modulation (MFM), which is often referred to as delay modulation or miller code.

The problem outlined above of utilizing a device for more than one application that may require different BPS transmission rates is solved by the present unique synchronous data format which uses a command word in the control information frames to identify subsequent transmitted data information frames. The command word identifies the type of information being transmitted and, depending upon the type of information to be transmitted, may instruct the receiving unit to change speed, therefore not restricting the device to one fixed speed. It is possible that two or more modulation techniques may be combined, wherein one modulation technique utilizing 1 bit/Hz efficiency is used for the control or data information sent at lower BPS rates, and another modulation technique utilizing a 2 bits/Hz efficiency is employed for data or voice information sent at higher BPS rates, if needed, to remain substantially within the 300 to 3200 Hz voice pass-band. The present device and method is also suitable for use with existing telephone systems because the data rate is slow enough that several modulation techniques that utilize at least a 2 bits/Hz efficiency allows the information to remain within or substantially within the pass-band of 300 to 3200 Hz. Such telephonic modulation techniques may include CPM, MFM, and quadrature amplitude modulation (QAM) commonly known in the art.

Broadly speaking, the present invention contemplates an improved digital encryption device comprising a radio interface connected to a conventional radio and adapted to receive a non-secure signal. A codec is selectively coupled to the radio interface for receiving the non-secure signal and for converting the signal into a pulse code modulated signal. Herein defined, a pulse code modulated signal is any signal that has been converted from analog to digital format. A signal processor is also selectively coupled and adapted for converting the pulse code modulated signal into a digitally encrypted NRZ signal. Further, a modulating means is also selectively coupled for modifying and inputting the digitally encrypted NRZ signals into the conventional radio which modulates a carrier signal with the modified digitally encrypted signals on an occupied bandwidth approved for narrow spaced channels such as 11.4 KHz spaced channels, greater than 11.4 KHz spaced channels, or 15 KHz to 25 KHz spaced channels. The modem may use modified frequency modulation format for inputting the modified digitally encrypted signals into the conventional radio placing the modified digitally encrypted signals substantially within a passband of 300 HZ to 3,200 Hz (i.e., a passband within the voice passband). At a plurality of times per second, a voice block of modified digitally encrypted signals is transmitted, each transmission preceded by a master prologue block. The voice block may be input into the radio by the modem at a faster, the same, or slower rate than the master prologue depending upon the configuration of the command words located within the master prologue.

The present invention also contemplates a communication system for providing secure communication over a communication channel comprising a conventional radio capable of transmitting and receiving signals occupying a bandwidth approved for narrow spaced channels such as 11.4 KHz spaced channels, greater than 11.4 KHz spaced channels or 15 KHz to 25 KHz spaced channels. A radio interface unit is connected to the radio, the interface unit includes a codec, a signal processor and a first and second modem. The codec codes and decodes a non-secure signal to and from a pulse code modulated signal. The signal processor converts the pulse code modulated signal to and from compressed voice coded signals and digitally encrypted NRZ signals. The first modem further compresses (modifies) and decompresses (demodulates) the digitally encrypted NRZ signals at a rate of 2 bits per Hertz (Hz) and then inputs and receives the modified digitally encrypted signals to and from the radio. Finally, the second modem within the radio then modulates a carrier signal with the modified digitally encrypted signals as a secure signal for transmission over a communication channel. A remote radio receives the secure signals at the receiving end and starts the demodulating process.

Still further, the present invention includes a method of transmitting and receiving encrypted communication signals using a conventional radio. The method begins by encoding a transmitting non-secure communication signal into a transmitting digital signal. Next, the transmitting digital signal is encrypted into a modified digitally encrypted signal. A carrier signal occupying 15 KHz to 25 KHz spaced channels is then modulated with the modified digitally encrypted signal for transmission over a communication channel. After transmission, the encrypted digital signal is demodulated and decrypted to produce a receiving digital signal. Thereafter, the receiving digital signal is decoded to produce a receiving non-secure communication signal substantially equal to the transmitting non-secure communication signal.

In another aspect of the present invention, a method is provided of transmitting and receiving synchronous digital information wherein the critical control information frames may be transmitted and received at one BPS rate, and the subject information frames are transmitted and received at the same or another BPS rate by the use of command words contained within the critical control information frames.

Another aspect of the present invention provides a repeater encryption/decryption device which is connected to a conventional repeater for controlling the repeater functions during transmission of a carrier-modulated modified digitally encrypted communication. The repeater communications controller may also receive, decompress (demodulate), error-correct the unencrypted critical control information, and re-compress (re-modify) the digitally encrypted signal for re-transmission without descrambling the digitally encrypted information.

Still further, another aspect of the invention provides a device and method for inputting digital information into a conventional radio that is compatible with the new digital radio standards in the digital mode. The standards include Federal Standard 1024 and Associated Public Safety Communications Officers, Inc. Project 25.

BRIEF DESCRIPTION OF THE DRAWINGS

Other objects and advantages of the invention will become apparent upon reading the following detailed description and upon reference to accompanying drawings in which:

FIG. 6 is a diagram of a master prologue according to the present invention;

FIG. 8 is a diagram of a secondary command/data block according to the present invention;

FIG. 9 is a table showing the pin assignments of the auxiliary RS232 serial port connector used in the present invention;

FIG. 10 is a table showing a partial listing of command words available for use in the master prologue and/or secondary command/data block according to the present invention;

Figure 1:
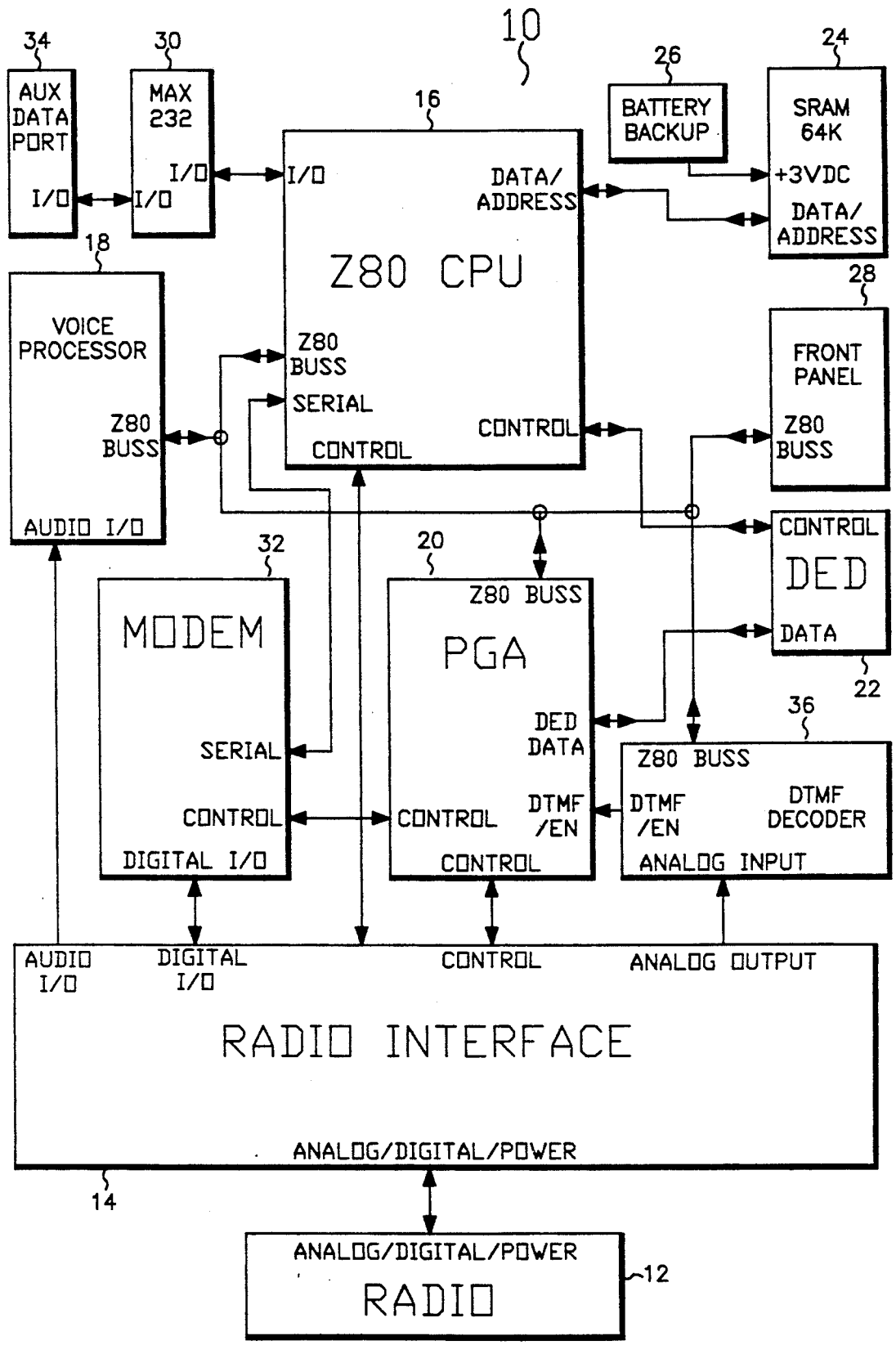
FIG. 1 is a general block diagram of the communication system, voice/data encryption system (VDES), according to the present invention.

While the invention is susceptible to various modifications and alternative forms, a specific embodiment thereof has been shown by way of example in the drawings and will herein be described in detail. It should be understood, however, that the drawings and description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF THE INVENTION

One embodiment of the present invention combines (i) an efficient vocoder such as VAPC, CELP, VSELP, IMBE or STC which will reproduce commercial quality voice at a transmission rate as low as 4800 BPS with (ii) an encryption algorithm such as DES with (iii) a non-linear modulation technique that achieves bandwidth efficiency of at least 2 bits/Hz.

For the vocoder, any commercial CELP-type vocoder, such as DOD-CELP, VSELP, ACELP, or VAPC that will reproduce commercial quality voice at approximately 4800 BPS are satisfactory. Using one of these voice encoding techniques allows a total BPS rate, including forward-error correction and control information, to be low enough that at least MFM will remain within the design limits of most conventional radios. The various CELP-type vocoders are easily obtainable. A suitable DOD-CELP vocoder is available from Sonitech International, Inc., Wellesley, Mass. A suitable VSELP vocoder is available from Motorola, Inc., Schaumburg, Illinois. A suitable ACELP vocoder is available at the University of Sherbrooke, Sherbrooke, Quebec J1K2R1. A suitable VAPC vocoder is available at Voicecraft Inc., Goleta, Calif.

As stated above, there are at least two commercially available vocoders that will perform satisfactorily at 2400 BPS. Such vocoders are the IMBE and the STC vocoder. With necessary forward-error correction, these vocoders provide commercial quality voice reproduction at 4800 BPS. A preferred vocoder is either IMBE or STC. Both the IMBE and STC vocoders are presently available for use on a Texas Instruments, Inc., digital signal processor part no. TMS320C31 with a suitable codec and are particularly suited due to their low BPS. A fixed-point processor will help lower power consumption for battery-operated (handheld) radio applications. Using a lower BPS rate vocoder also gives the possible advantage of remaining within the 300 Hz to 3200 Hz voice pass-band. A suitable IMBE vocoder is available from Digital Voice Systems, Inc., Cambridge, Mass. A suitable STC vocoder is available from AWARE, Inc., Cambridge, Mass. While either the IMBE or STC vocoders are suitable, it appears the IMBE vocoder will remain intelligible in higher BER conditions.

DES encryption standard may be selected as the preferred encryption algorithm due to it being the U.S. federal standard for non-military applications used for sensitive, unclassified information. The preferred output feedback mode was selected because it is the federally-approved mode for voice applications. The output feedback mode of DES exclusive-ors the data against an encrypted initialization vector (IV) and does not extend bit errors which is critical in the conventional radio environment. It should be noted that the present invention is not encryption algorithm unique. Other encryption algorithms as described in *Information Systems Security Products and Services Catalogue*, prepared by the National Security Agency, Fort Meade, Md. can be utilized as a suitable encryption algorithm for the present invention. Furthermore, it is appreciated that the present invention may operate to provide some transmission security without having to use an encryption technique such as DES.

A preferred baseband modulation technique is modified frequency modulation (MFM). MFM is particularly suited in that it provides 2 bits/Hz data compression for bandwidth efficiency and MFM passes little or no dc offset which is important when transmitting in a conventional radio environment. Because of its unique nature and due to its compression ability, MFM allows frequency components to be transmitted within the voice passband of 300–3200 Hz. Remaining within the voice passband of 300 to 3200 Hz may have advantages when transmitting through conventional repeaters, or stations located remotely via telephone cable, cellular transmissions, microwave transmissions, satellite communications, etc.

MFM transmits three main frequency components: 1) a high frequency tone at one half the BPS rate; 2) a low frequency tone at one quarter the BPS rate; 3) a middle frequency equidistant from the high and low frequency. Thus, when using MFM as the preferred modulation method, voice BPS rate of 6400 BPS can be transmitted at frequencies components of 3200, 2400, and 1600 Hz.

While it is noted that the frequency components are not totally within the 300 Hz to 3,000 Hz range, the selection of 6,400 BPS as the preferred voice data rate with a corresponding 3,200 Hz high frequency component is the result of a trade-off that gains 400 BPS forward-error correction for a less than 10 percent signal loss. Using the formula 40 $\log_m$ (f/3) decibels for the low pass filter as defined above in FCC Rules and Regulations Part 22.508 dated Oct. 1, 1988, the signal level of the high frequency component of 3,200 Hz will be approximately 1 db lower than the other frequency components. This is expected to cause negligible signal loss in return for a gain of 400 BPS forward-error correction. It should be noted that the BPS rate can be lowered to remain totally within the voice passband of 300 to 3,000 Hz. However, as can be appreciated by those skilled in the art, since the low pass filter only attenuates the signal, practically speaking the transmission of a 3,200 Hz frequency component is within the voice passband.

Also, it should be noted that when using MFM at a 6,400 BPS rate which transmits a 3,200 Hz highest frequency component, the entire bandwidth for 15 KHz to 25 KHz spaced channels is not necessary. Using the formula $B_n=2M+2DK$ defined above in the FCC Rules and Regulations Part 2.202 dated Oct. 1, 1987 and Part 22.507 dated Oct. 1, 1988, the necessary bandwidth for a 3,200 Hz highest frequency component should be as follows:

Maximum necessary bandwidth at $+/-5$ KHz deviation:

$B_n=2(3200\ Hz)+2(10000\ Hz/2)(1)$
$B_n=6400\ Hz+10000\ Hz$
$B_n+16400\ Hz$ or $16.4\ KHz$

Nominal necessary bandwidth at $+/-4$ KHz deviation:

$B_n=2(3200\ Hz)+2(8000\ Hz/2)(1)$
$B_n=6400\ Hz+8000\ Hz$
$B_n+14400\ Hz$ or $14.4\ KHz$

Minimum necessary bandwidth at $+/-2.5$ KHz deviation:

$B_n=2(3200\ Hz)+2(5000\ Hz/2)(1)$
$B_n=6400Hz+5000\ Hz$
$B_n+11400\ Hz$ or $11.4\ KHz$

Therefore, the technique of MFM at 6,400 BPS data rate should be applicable to communication channels that occupy a bandwidth of 11.4 KHz, or greater. It should also be applicable to communications channels that will pass audio frequency components within a 300 to 3,000 Hz passband utilizing low pass filters as specified in the FCC Rules and Regulation Part 22.508 dated Oct. 1, 1988.

A suitable BPS rate for the control information or master prologue is 3200 BPS which will translate to transmitted frequencies of 1600, 1200 and 800 Hz, all within the approximate 300 to 3200 Hz voice passband. It should also be noted that various BPS rates may be employed, and it may not be necessary to change speeds to remain within a suitable transmission frequency range as set forth by the present invention. A suitable MFM modem is available from GLB Electronics, Inc., Buffalo, N.Y., Model No. HSM-5.

It should also be noted that it is not necessary that all transmitted digital frequency components remain within the voice passband of 300 to 3200 Hz to remain within the 15 KHz and 25 KHz spaced channels. Other non-linear modulation techniques that gain 2 bits/Hz bandwidth efficiency, such as Continuous Phase Modulated (CPM) techniques, including but not limited to MSK, will also adequately implement the invention at a preferred low BPS. For example, at the preferable data rate of 6400 BPS, MSK transmits main frequency components of 1600 and 4800 Hz. While these frequencies do not remain in the voice pass band, the 3200 Hz frequency separation should be within the design limits of substantially all conventional radios when the low pass filter is bypassed, and should remain well within the 15 KHz to 25 KHz spaced channels. A suitable MSK library is available from Sonitech International, Inc., Wellesley, Mass.

A device that is used for a plurality of applications must contain a methodology in which to advise the receiver of the type of information being transmitted. Such methodology is called a "command word." It should be understood that single application devices of the present invention could be constructed which do not include a command word. Such single purpose devices would naturally include voice encryption, data encryption, fax encryption or other digital transmission applications. This invention, however, is not single purpose specific and, as such, is not limited to a specific speed, data format or application. It is intended that any combination of digital voice coding and modulation techniques falls within the scope of this invention if the combined techniques provide commercial quality voice reproduction at a BPS rate that will remain within the 15 KHz to 25 KHz spaced channels and transmit frequencies that are within the design limits of conventional radios.

The present invention thereby provides a voice/data digital encryption system (VDES) for insertion into a conventional radio communication path. The VDES is installed at each radio port with the preferred DES encryption methodology. Further, VDES in combination with external data terminal equipment (DTE), offers the added ability to encrypt and decrypt digital data from an auxiliary serial data port. The auxiliary serial data port may include an RS232 port and is capable of adapting to a plurality of BPS rates. As defined herein, RS232 is Electrical Industrial Standard V.24 and V.28 as referenced in Amateur Radio Relay Leagues Handbook pp. 19-29, 1989. Master keys (or DES codes), command words, or other control information can be changed periodically via the auxiliary data port using a hand-held programmer or optional software using a computer. Thus, air rekeying of the master keys is possible through the data port. The master keys or other control information for a unit may also be changed through an optional DTMF encoder/decoder.

The VDES unit transmits an unencrypted prologue block (master prologue) which will control all of the command functions over the communication path, i.e., air or telephone line. The master prologue block may include a sub-block enabling the authorized receiving unit to load proper master key and decrypt the message regardless of whether it is voice or data. Thus, the master key need not be transmitted. The master prologue may also send a secondary command block that provides the ability to erase master key memory or change master key data when properly addressed and instructed. Other features may include 1) the ability to activate the push-to-talk (P.T.T.) sequence on a remote unit, 2) the ability to code voice into an efficient size for storing and transmission at a low speed for playback at full speed for communications data reliability, 3) the ability to modulate the digital information which is compatible with various communication channel BPS rates or protocols.

The conventional radios retrofitted or designed with the VDES allow digital encryption/decryption communication between a portable unit to a satellite receiver, through a repeater, through a base station receiver, through telephone lines and/or through audio interconnect and patching systems. The encryption/decryption system of the present device thereby utilizes one of the latest vocoders, preferably STC or IMBE voice coder with DES-type encryption/decryption format, and a 2 bit/Hz bandwidth efficiency using a preferred MFM technique for its modulation/demodulation methodology. The present invention also uses forward error correction techniques such as: bit averaging, cycle redundancy checks (CRC), matrix extraction, bit redundancy, punctural convolution coding, progressive interleaving and soft decision, all commonly known by those skilled in the art.

In addition to being able to adapt and retrofit with existing conventional radios, the present invention also can transmit or receive secure signals at various data rates. A secure data bit stream or voice can be sent through the communication channel at slower speed for playback at full speed. The preferred embodiment of the invention contemplates a dynamic BPS change between the base BPS rate, or control information (master prologue), and the subsequent voice data block. One suitable BPS for the master prologue is 3200 BPS, whereas one suitable speed for real-time voice data is 6400 BPS. Suitable data rates for other types of information, i.e. fax, ASCII data, or secondary commands may also be different, such as 1200 BPS to 6400 BPS or higher.

Thus, the preferred embodiment of the present invention contemplates a communication system for providing secure communication over a conventional radio channel. The system comprises a conventional radio capable of transmitting and receiving nonsecure analog signals. Retrofitted or designed into the conventional radio are means for converting the radio into a digital encryption device having a vocoder block that includes a codec, voice coder within a signal processor, an exclusive-oring means and a modem. The codec is coupled to receive the nonsecure analog signals and convert those signals into pulse code modulated (PCM) digital signals. The signal processor then receives the pulse code modulated signals and compresses the data into a relatively small number of binary bits through the voice coder algorithm, preferably using either the IMBE or STC voice coder.

The IMBE or STC voice coded signals are preferably exclusive-ored through the output feedback mode of DES by a main processor, to produce digitally encrypted NRZ signals. The digitally encrypted NRZ signals are then modified and then input into a conventional radio for transmission over the radio channel by a modem that preferably places all of the transmitted information in the 300 to 3200 Hz frequency range. The present system contemplates using a 2 bits/Hz compression modulation technique (preferably MFM) that is also compatible with conventional non-linear radio designs. These compressed, digitally encrypted NRZ and further modified digitally encrypted signals are then transmitted in response to the master prologues created by the VDES.

After the modified digitally encrypted signals are transmitted by a conventional radio, another retrofitted radio receives the encrypted signal and decrypts the signal to a recognizable analog signal. The decryption technique employs a digital decryption device including a modem, an exclusive-oring means and the voice decoder block. The modem receives and decodes the modified digitally encrypted signals and outputs in digitally encrypted NRZ data format. A main processor then receives the digitally encrypted NRZ-formatted signals and performs digital decryption and the signal processor performs voice decoding of the signals. The decrypted and decoded signals are then converted into analog output by the codec and transferred to a speaker or output terminal.

In conventional or trunked radio systems that utilize one or more conventional repeaters, the receiving radio may be a conventional repeater in which the clear (unsecure) signals are retransmitted to remote receivers for reception. During clear transmissions, the conventional repeater is generally controlled by squelch activation, wherein a received carrier frequency on the assigned channel will activate the repeater. Alternatively, the conventional repeater is controlled through the use of a continuous tone coded squelch system (CTCSS). CTCSS activates and deactivates the repeater and remote receivers through transmitted subaudible tones (frequencies), generally ranging from approximately 60 Hz to 270 Hz. These tones are continuously added by the transmitter to the clear transmission when using a CTCSS.

An advantage of the present invention is the modified digitally encrypted (secure) signals are compatible with the bandwidth and frequency component restrictions of conventional repeaters. This means substantially all existing conventional repeaters can be upgraded to include digital encryption, without replacing the pre-existing functioning equipment. During secure transmissions utilizing conventional repeaters, it is preferable that a repeater communications controller (RCC) be installed at each remote repeater location to control the repeater functions, i.e. activate and de-activate the repeater, including disabling the CTCSS during modified digitally encrypted transmissions of the present invention. The RCC is preferable because the CTCSS tones have been shown to cause interference during reception of the secure transmissions. It is possible for the RCC to control the repeater during both secure and non-secure (clear) transmissions thereby eliminating the need for the CTCSS. Conventional repeater systems are also known to cause shifts in the phase of the modified digitally encrypted transmitted signals. Thus, it is also preferable the RCC provide a method to decompress or demodulate the secure signals to NRZ format. This demodulation process removes from the secure transmission the cumulative effects of noise between the transmitter and the repeater and provides a method to bypass the shifts in phase caused by the conventional repeater. The demodulation process by the RCC also provides a method wherein the unencrypted critical control information can be error-corrected without decrypting the modified digitally encrypted information.

Thus, modems complimentary to the VDES modems are installed within the RCC where the modified digitally encrypted transmission is demodulated to NRZ format, the unencrypted critical control information is then error-corrected by replacing the detected errors with correct information. The unencrypted corrected critical control information with the demodulated digitally encrypted NRZ signal is then re-modified (re-compressed) by a complimentary transmit modem and input into the repeater modulator for retransmission to remote receivers for demodulation and decryption.

When a plurality of repeaters are included within a conventional radio system, determining which repeater retransmits the normal analog (clear) signal is generally accomplished by a voter system, i.e. a system that automatically determines which repeater should be activated by measuring comparative signal strength by each received repeater. When digitally encrypted signals are transmitted to a plurality of repeaters, either a voter system or a selective signaling method selects which repeater is to retransmit the secure transmission. The RCC has no effect on conventional voter systems, and an individual repeater could be selected in the digital coded squelch block of the master prologue, if so programmed. Thus, without modifications, it is believed the RCC of the present invention is the first to upgrade substantially all existing conventional repeater systems to include digital encryption whether the system contains one, or a plurality of conventional repeaters. Typical modifications required by previous digital encryption methods require the use of linearized amplifiers and/or include bypassing or modifying the low pass filters as described elsewhere herein.

Turning now to the drawings, FIG. 1 illustrates a communication system (VDES) of the present invention. VDES, using device 10, was designed and tested on frequency modulated (FM) radios, but can also be used on conventional phase modulated (PM) radios and trunked radios designed for 15 KHz to 25 KHz spaced channels. It is also suitable for channels substantially narrower than the 15 KHz to 25 KHz spaced channels. Device 10 includes a device which is connected to (i.e., retrofitted to or designed for) a conventional radio unit 12 such as a hand-held radio, base station, remote satellite transceiver, and mobile radio using a shielded multi-conductor cable or other suitable interface. Radio 12 is designed to receive or transmit analog voice information. Connected to or retrofitted with radio 12 is device 10 which includes the blocks illustrated in FIG. 1. Radio interface 14 provides ports necessary to couple device 10 with radio 12 such that voice sent through a radio microphone can be input into interface 14 or, conversely, encrypted voice sent from a remote radio can be input into interface 14. The design of interface 14 allows device 10 to accommodate a large variety of radio transceivers such that device 10 may be retrofittable externally or designed within conventional radios 12. Thus, radio interface 14 allows the incorporation of device 10 with substantially any existing analog radio system to include secure digital data/digitized voice communications. This upgrade can be accomplished without replacing the functional radio equipment already in place.

Although numerous designs can be implemented for system process control, device 10 can be suitably built around the Zilog Z80 based processor 16, model no. Z84C1510VEC intelligent peripheral controller (IPC), or Z80 central processor unit (CPU). The CPU 16 has integrated into a single die numerous functions which reduce the package count of the overall device 10. It should be noted that an equivalent number of single function integrated circuits or discrete components can be substituted for CPU 16 and still fulfill the object of the present invention. Also, multi-chip modules, hybrid circuits or more sophisticated integrated circuits may be used to reduce the package count of the overall device 10.

CPU 16 includes hardware necessary for various applications including: a central processor unit (CPU), clock oscillator (OSC), watch dog timer (WDT), four channel counter timer controllers (CTC), two separate universal synchronous asynchronous receivers/transmitters (USART) and two separate eight bit parallel input/output (PIO) controllers. Within CPU 16, USART A is used to communicate to the auxiliary data port 34 and USART B is used to communicate with modem 32. The two PIO's are used to interface to the rest of device 10 while WDT monitors the activity of the CPU 16 and resets device 10 should the CPU 16 get lost.

In order to provide logic connection to and from other hardware found throughout device 10 and CPU 16, it is intended for the present device to employ programmable gate arrays (PGA). PGA 20 is shown connected between CPU 16 and other hardware found throughout the device 10. PGA 20 may be any device, or devices, which provides programmable logic such as, but not limited to, programmable logic devices (PLD), erasable programmable logic devices (EPLD), field programmable logic devices (FPLD), or standard, discreet logic devices. Preferably, PGA 20 functions as the heart of the device 10 interconnect hardware and may be purchased from XILINX Inc., San Jose, Calif., model no. X3000 series.

PGA 20 thereby replaces numerous standard logic circuits and reduces the manufacturing cost and inventory cost of the present device 10. PGA 20 also decreases the power requirements for device 10 and is completely re-programmable if interconnect changes must be made. Configuration changes can be made through a serial programmable read only memory (not shown) connected to PGA 20 in order to load PGA 20 with its start-up configuration. Serial programmable read only memory (SPROM) can be purchased from Advanced Micro Devices, model no. AM1736A-DC. This SPROM is a one-time programmable device and the format used to store the information in SPROM is proprietary to XILINX R ®.

PGA 20 thereby provides hardware logic interface to and from the CPU 16, and other functional blocks of the device 10. PGA 20 may be coupled to data encryption device (DED) 22 to CPU 16. Thus, data encryption standard (DES) codes can be routed from DED 22 via control bus and data bus, through PGA 20, and into CPU 16. A suitable DED 22 may be purchased from Texas Instruments, model no. TMS75C00FNL. Device 22 is a peripheral device designed to perform the National Bureau of Standards Data Encryption Standard (DES) as specified in Federal Information Processing Standards publication (FIPS PUB) 46.

As a means for controlling device 10, panel controls 28 are configured onto the outer panel surface of a radio 12 containing device 10, or controls 28 may be incorporated onto the outer panel of device 10. Controls 28 are situated as switches (such as poly-dome switches) and LED indicators. The switches and LEDs control the function of device 10 through an outside operator. The operator controls various functions of device 10 by activating switches on front panel control 28 in response to indicator lights on same. There is provided a key or mode selector switch on front panel 28 which is used to select one of at least four modes of operation which include, but are not limited to, "off", "on", "self test" and "program mode". Other examples of front panel controls 28 may be a selection of one of a plurality of secure modes, activation of a delayed message or "talk and run" feature, and selection of the "clear" or normal mode. Thus, functions can be initiated from the front panel and carried forth in CPU 16.

In order to restrict unauthorized operation of device 10, the mode selector can be replaced by a high security key switch, such as a MEDECO ® keyswitch. The front panel 28 communicates with the CPU 16 through use of one of the parallel input/output device PIOs (not shown) located near the front panel. A preferable PIO device may be purchased from ZILOG Corporation, part no. Z84C2010FEC. Thus, a plurality of different front panel controls can be implemented such as a remotely mounted and controlled unit incorporating a control head placed at a different location than device 10 main unit.

CPU 16 serial input/output port (SIO) A USART is used to communicate with device 10 auxiliary data port 34, through the RS232 transceiver 30. The RS232 transceiver 30 is used to translate the NRZ digital data from the SIO A USART into RS232 compatible signals for the auxiliary data port 34. The RS232 transceiver 30 is also used to translate the RS232 compatible signals from the auxiliary data port 34 into NRZ digital data presented at the SIO A USART. There are many designs available to implement this translation, however, a suitable design can be purchased from MAXIM Integrated Products, Inc., part no. MAX232.

CPU 16 SIO B USART is used to communicate with modem 32. Modem 32 is used to modify and input the digitally encrypted data into the conventional radio 12 from the USART in such a manner that the bandwidth restrictions of a conventional radio can be met. Modem 32 can be but is not limited to a half duplex transceiving modulator/demodulator. It may be desirable to include a proper low pass filter (not shown) on modem 32 to solve any problems interfacing to radio 12.

SRAM 24 contains the data storage medium used in device 10. SRAM 24 may consist of at least two devices with a total memory of 65,536 eight bit data addresses. Each of the two memory devices contains data space of 32,768 addresses. The memory device which is addressable from 00000 to 32,768 is used for device 10 basic input/output structure (BIOS), while the memory device which is addressed from 32,769 to 65,536 is used for variable data storage, such as voice mail, master key data, data waiting for transmission, data received, and miscellaneous data. Additional, or various, memory devices may be included, such as the Hewlett Packard Corp. "Kittyhawk" personal storage module or flash memory chips obtained from Intel Corp., part no. I48F512.

The SRAM 24 devices are connected to battery backup controller 26. The use of controller 26 with SRAM 24 is to protect SRAM 24 from loss of data during the time the power source is fluctuating or lost, such as during disconnection of device 10 power. Controller 26 is used in conjunction with a three volt lithium battery. The lithium battery supplies the power supply backup necessary to maintain data integrity in the SRAM 24. Many designs can be used to accomplish the task of SRAM 24 battery backup. It is just one choice of the present invention to use a device which can be purchased from Dallas Semiconductor, Inc. model no. DS1212S.

An optional DTMF decoder 36 can be used to decode any DTMF tones which are sent into the microphone connector by the user. The DTMF tones can be used to reprogram device 10 when the key selector switch is in the "program mode" instead of using the auxiliary data port 34. Many designs can be used for DTMF decoder 36, however, a suitable DTMF decoder may be purchased from Silicon Systems Inc. model no. SSI202N.

Figure 2:
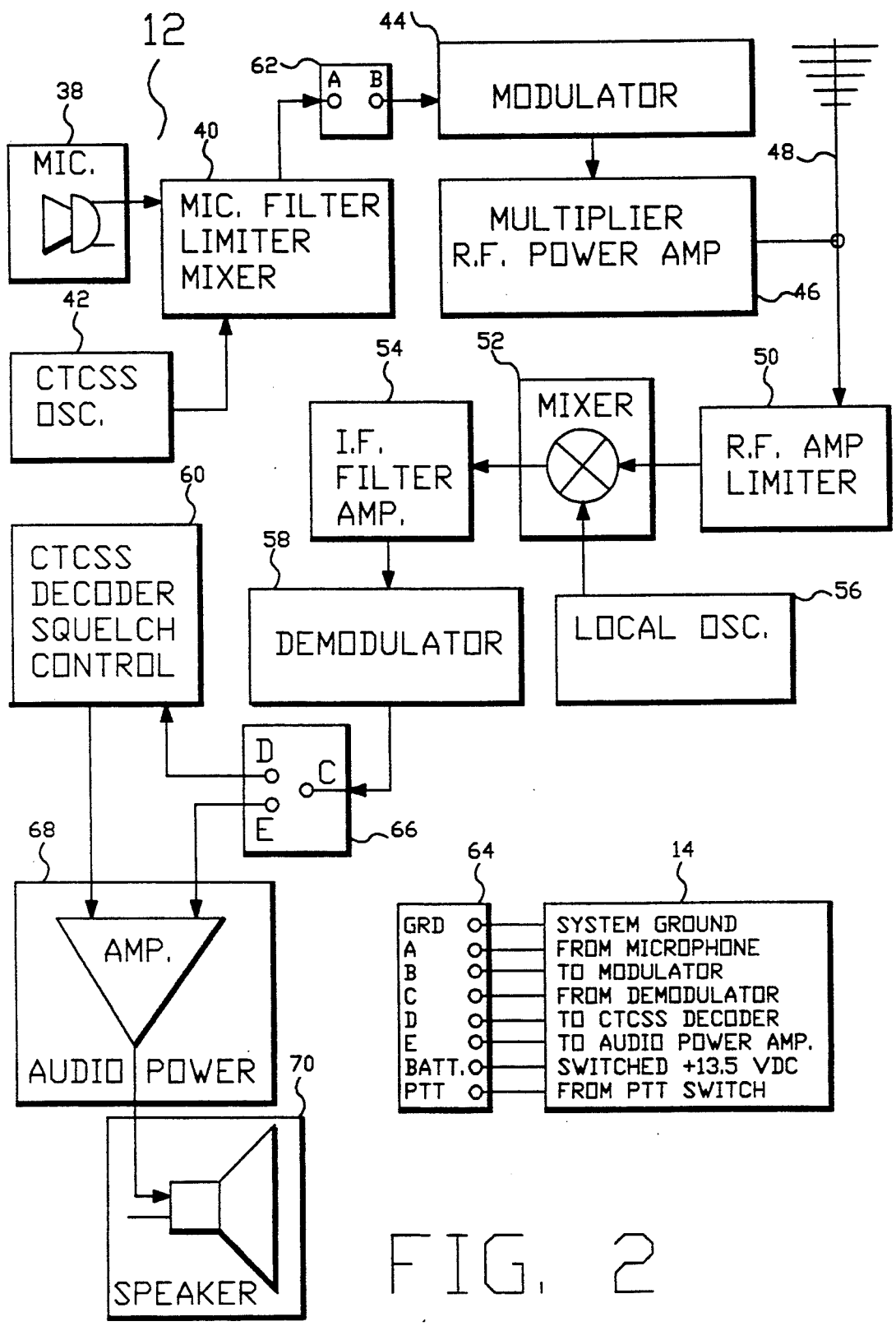
FIG. 2 is a block diagram of a conventional radio modified and/or retrofitted according to the present invention.

In FIG. 2, a block diagram is shown of a conventional analog radio 12 having modifications to accommodate device 10. The standard transceiver of radio 12 includes: microphone 38, microphone filter limiter mixer 40, continuous tone coded squelch system (CTCSS) oscillator 42, modulator 44, multiplier 46, communication channel 48, R.F. amplifier limiter 50 at receiver end of channel 48, mixer 52 and I.F. filter amplifier 54. Included is a local oscillator 56 which interfaces with mixer 52 to suffice as receiver tuner. Demodulator 58 and CTCSS decoder squelch control 60 receive filtered output from I.F. amplifier 54. FIG. 2 also details in block 64 and interface 14 the connections required for device 10 to retrofit or connect to radio 12 at blocks 62 and 66. In order for conventional radio 12 to accommodate device 10, it is preferable to tap into and intercept the signal at locations A and B in block 62 between mic. filter limiter mixer 40 and modulator 44 for transmit, and locations C, D, and E in block 66 between the demodulator 58, CTCSS decoder squelch control 60, and audio power amp 68 for receive. This type of interception and rerouting requires no component modification to radio 12 existing configuration and it also allows for normal operation when in the non-secure mode.

Figure 11:
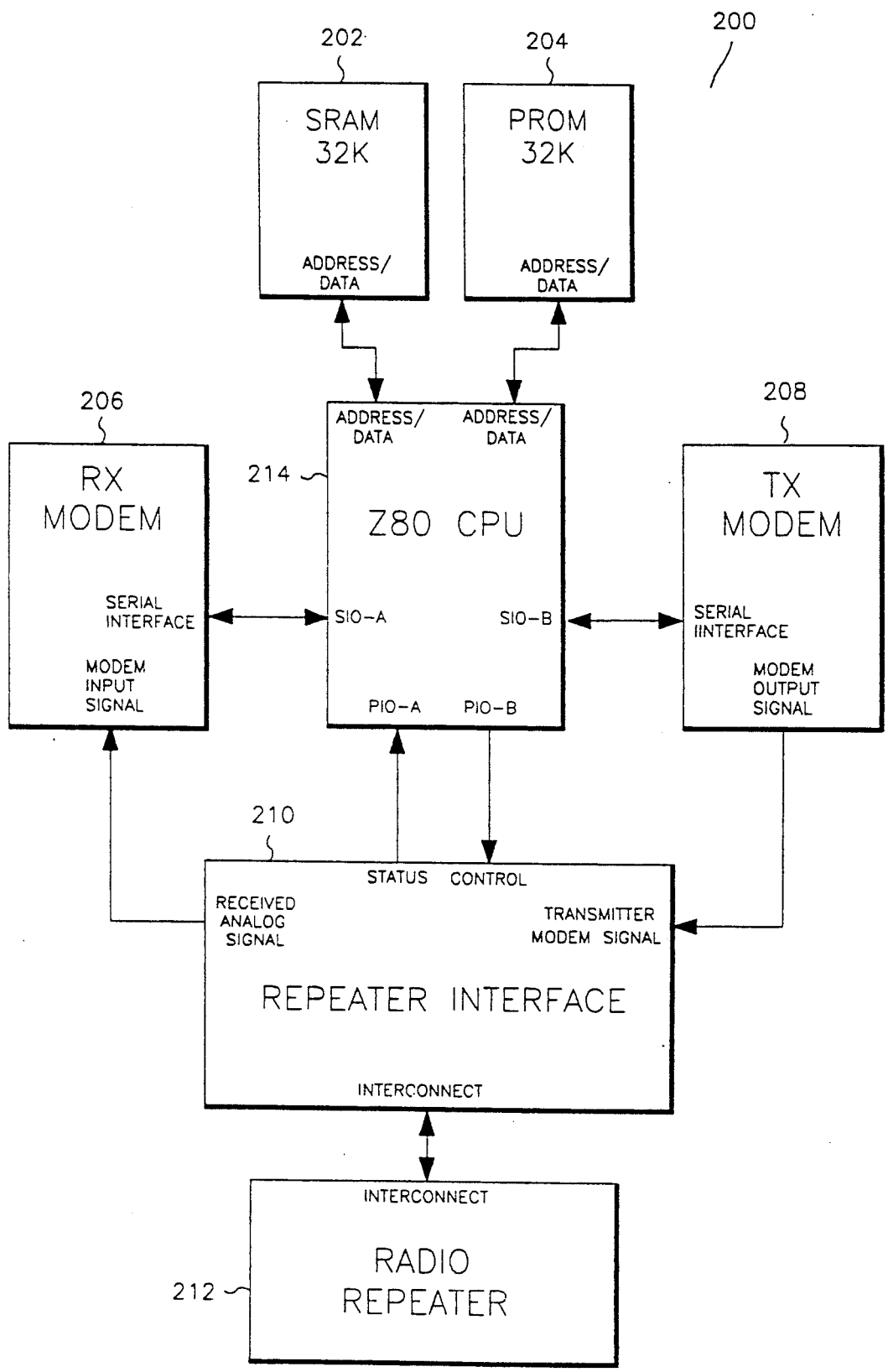
FIG. 11 is a block diagram of a repeater communications controller according to the present invention.

It should be noted that interface 14 in FIG. 2 is customizable and may include more connections than shown. For instance, it may be preferable to include a higher quality demodulator circuit 58 in device 10 to improve conventional radio 12 performance. In this case terminal C of block 66 would be located between I.F. filter amp. 54 and demodulator 58. It is also preferable that the CTCSS oscillator 42 be disabled during secure transmissions such that on some conventional radios a hardwired CTCSS disabling circuit may be provided instead of using radio software disabling command. Since the CTCSS Oscillator is generally used on conventional radios to control squelch of receiving radios and activating repeaters, another method of providing these functions is required. This is accomplished in the secure data master prologue and by providing a separate device (as shown in FIG. 11) consisting of complimentary modems and interface circuitry to activate repeaters during secure transmissions. Thus, customizable circuitry in device 10 and interface 14 are intended to include any required modifications to retrofit conventional radio 12.

Figure 3:
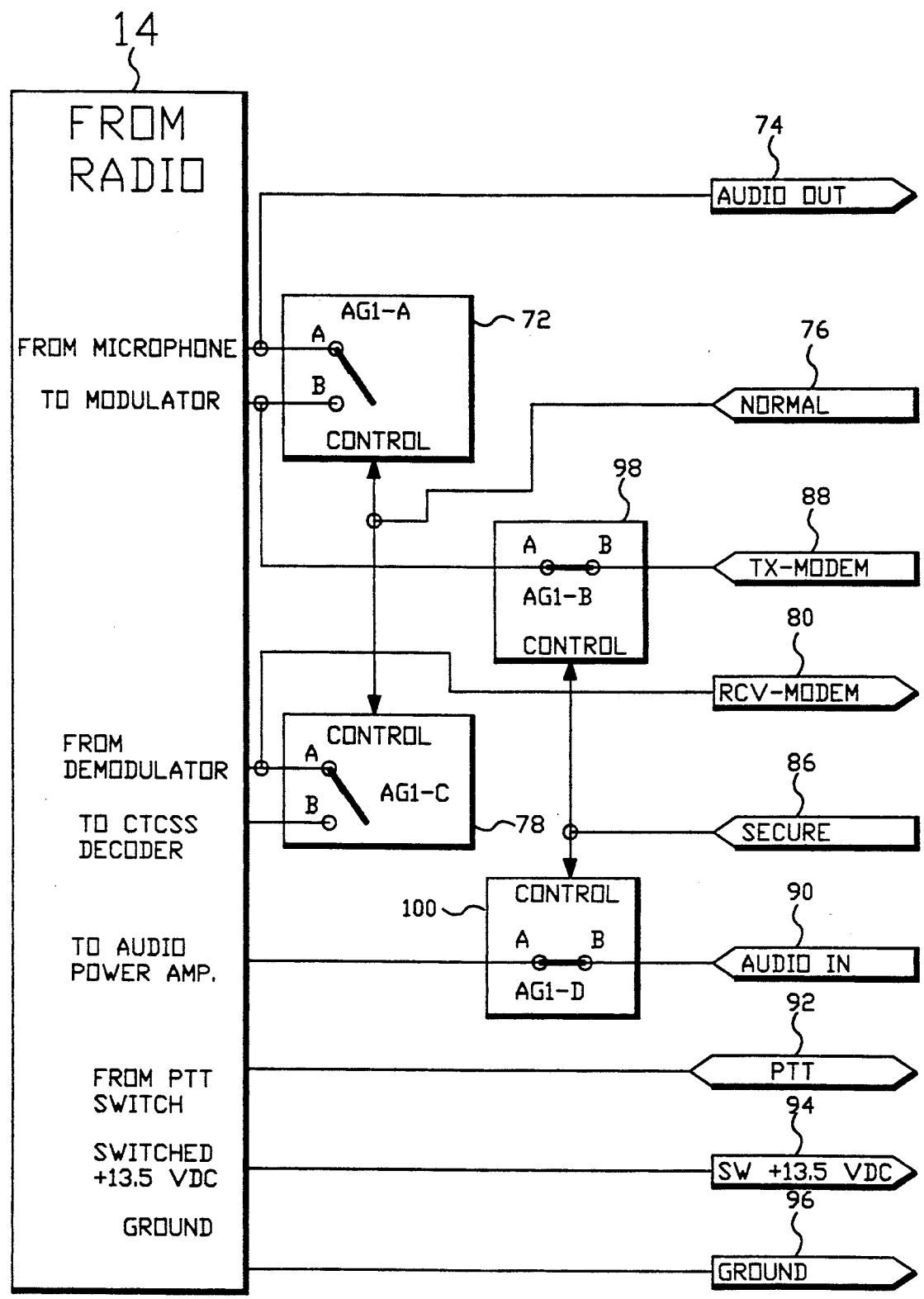
FIG. 3 is a block diagram of a radio interface controller according to the present invention.

FIG. 3 details the way in which device 10, through interface 14, selectively controls the signal path of radio 12, depending upon whether the radio is activated in a normal (i.e. clear, not secure) or secure (i.e. encrypted) mode. For purposes of explanation, signal flow for secure voice activated by front panel controls 28 is meant to include secure data activated through the auxiliary data port 34. As shown in FIG. 3, audio out 74, rcv-modem 80, (push-to-talk) PTT 92, switched power (or 13.5 volt DC battery backup) 94 and ground 96 are hardwired from radio 12 to device 10 via interface 14. Signals selectively controlled by device 10 are normal 76, tx-modem 88, secure 86, and audio in 90. If normal signal 76 is high, then AG1-A and AG1-C are closed while controllers AG1-B and AG1-D are open. Conversely, if secure signal 86 is high, then AG1-B and AG1-D are closed while AG1-A and AG1-C are open. Audio out 74 and rcv-modem 80 are connected so device 10 is constantly ready for secure communications. PTT 92 circuit and power regulator (not shown) provide a method of obtaining PTT 92, power 94 and ground 96 for device 10. Thus, whenever PTT switch on microphone 38 is engaged, radio 12 prepares for signal transmission and advises CPU 16, through PTT interface connection 92, that the start of a voice signal transmission will begin.

The determination of whether the signal is to be normal or secure is made by previous manual selection of front panel control 28 or auxiliary data port of the device 10 transmitting unit, by selecting either the normal mode (whereby a normal signal 76 is sent) or secure mode (whereby a secure signal 86 is sent). Secure mode may include a plurality of modes. When the transmitted signal is detected by the receiving unit, CPU 16 in receiving device 10 temporarily overrides existing front panel control 28 setting and automatically prepares to receive the signal. The receiving unit will remain in the overridden mode temporarily after the transmission is complete in order to respond in the same mode (i.e. normal or secure), or as instructed by the command word received.

Referring to both FIGS. 2 and 3, when PTT on microphone 38 is activated, audio input is rerouted from terminal A of block 62 shown in FIG. 2 to terminal A of AG1-A controller 72 shown in FIG. 3. When normal mode is selected, normal signal 76 is activated while secure signal 86 is deactivated causing AG1-A controller 72 and AG1-C controller 78 to be closed whereby terminals A and B are coupled such that analog voice from microphone 38 is returned directly to terminal B of block 62 to modulator 44 for transmission over radio channel 48. The signal received from radio channel 48 is routed from terminal C of block 66 to terminal A of controller AG1-C and returned directly to terminal D of block 66 for continuance to CTCSS decoder 60 to audio power amp 68 and finally to speaker 70. In the normal transmission case, terminals A and B of AG1-B and AG1-D controllers are open so that secure signals are isolated.

Again referring to both FIGS. 2 and 3, FIG. 3 shows device 10 responding to secure signal 86 being active and normal signal being inactive. Controllers AG1-A 72 and AG1-C 78 are open isolating normal signals from radio 12. The analog signal is routed from terminal A of block 62 through audio out 74 to device 10 for digitizing, voice coding, encrypting and modifying with a modulation technique suitable for conventional radio 12 as described hereinabove. Once the signal has been encrypted and modified, the resulting signal is received by radio 12 through tx-modem 88, AG1-B control 98, and interface 14 to terminal B of block 62 for continuance to modulator 44 and subsequent transmission over the radio channel 48. After the modified digitally encrypted signal has been transmitted over channel 48, it is received as a secure signal from demodulator 58 and routed from terminal C of block 66 through rcv-modem 80 into device 10 for demodulation, decryption, voice decoding and conversion to analog. The resulting decrypted analog signal is then routed through audio in 90, AG1-D control 100 to terminal E of block 66 for continuance to audio power amp 68 and speaker 70.

Figure 4:
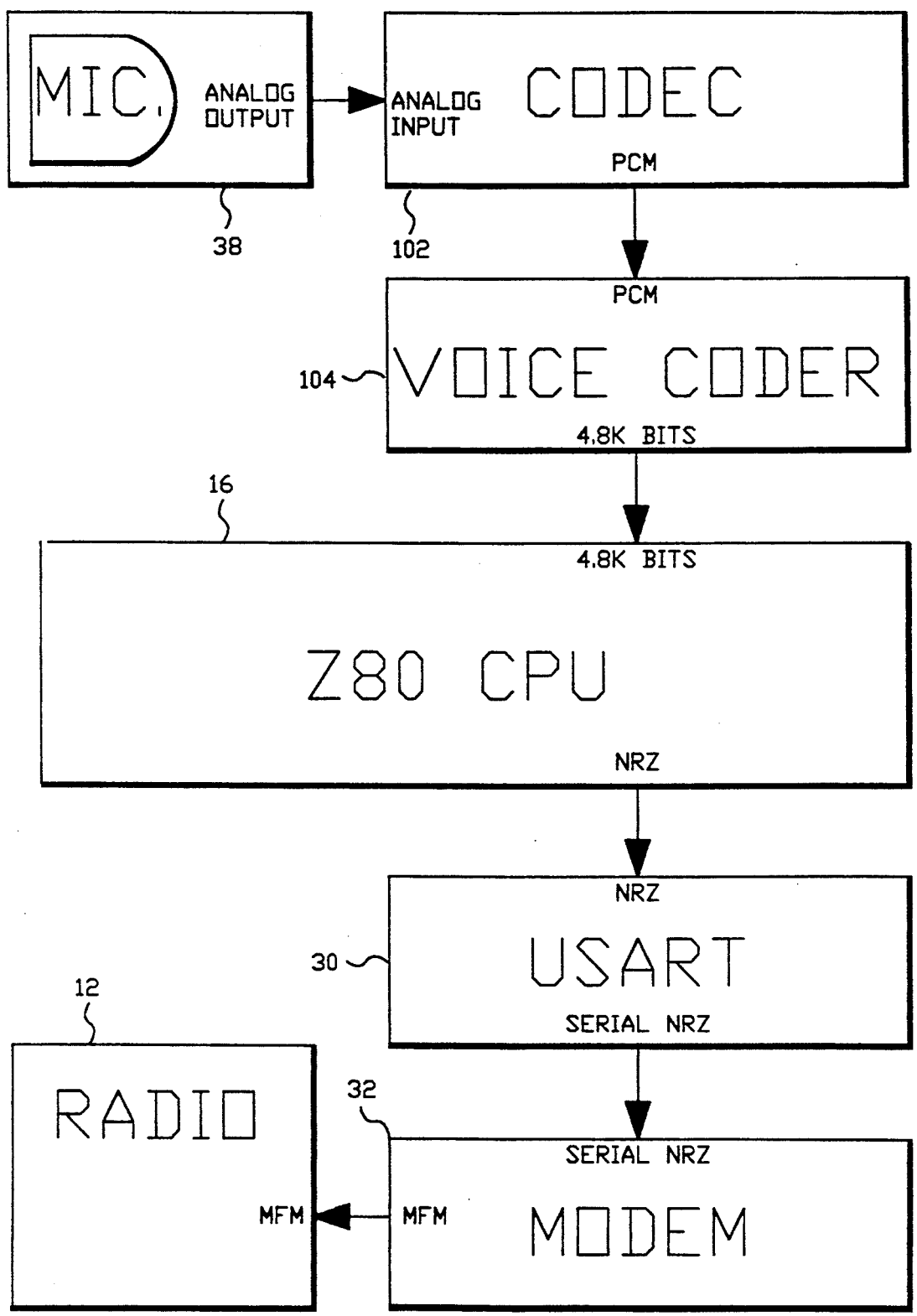
FIG. 4 is a block diagram of a transmission voice process flow according to the present invention.
Figure 7:
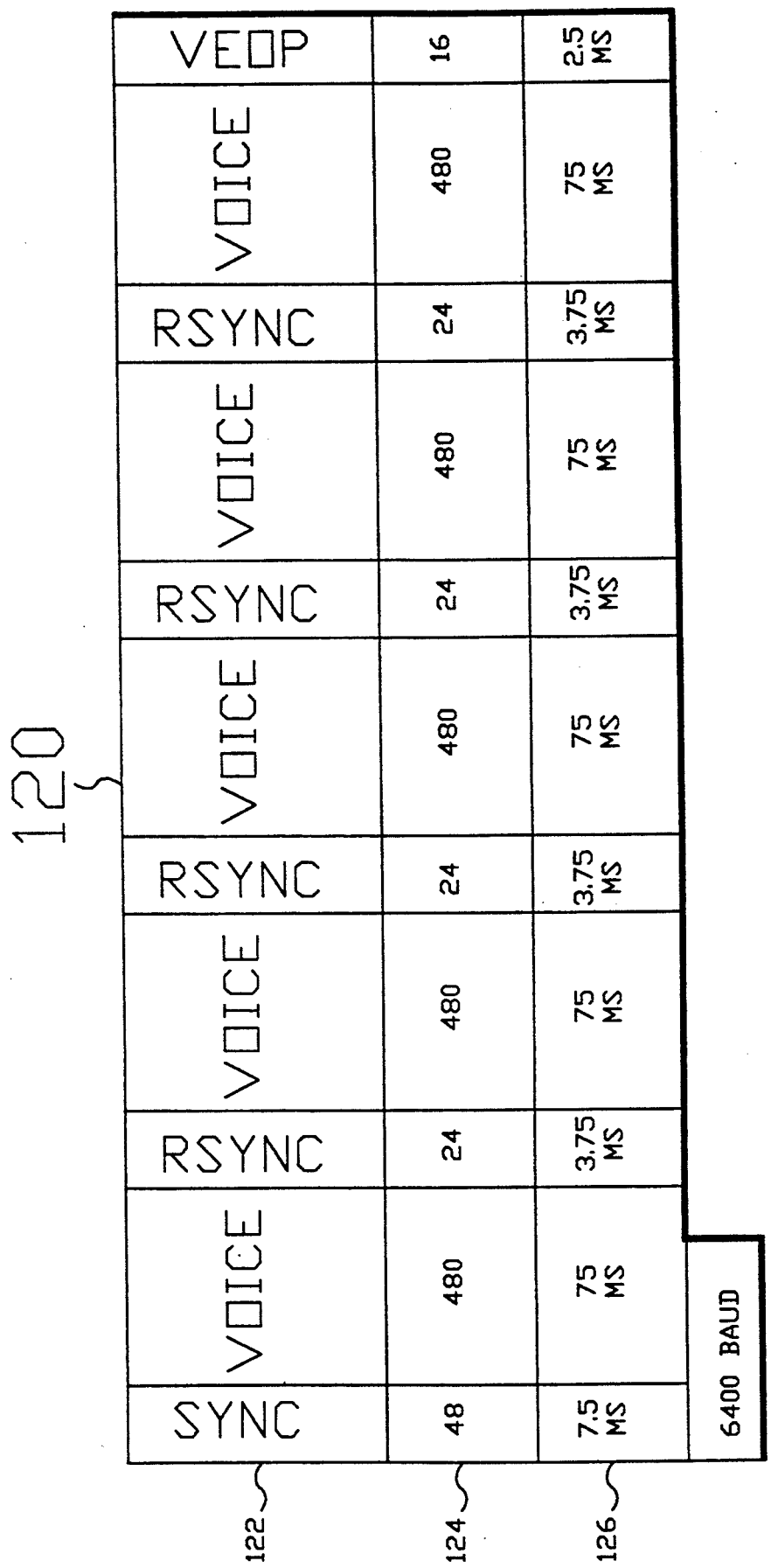
FIG. 7 is a diagram of a voice block according to the present invention.

FIG. 4 is a block diagram illustrating the preferred method of digital voice encoding utilizing device 10 of the present invention. The voice signal begins in analog form at microphone 38. Codec 102 within voice processor block 18 of FIG. 1 converts the analog signal to pulse code modulated (PCM) digital format having a possible serial output of approximately 64,000 BPS. This digital PCM signal is then compressed by the voice coder 104, preferably an STC or IMBE vocoder, which is also contained within a signal processor located with the voice processor block Voice coder 104 compresses the serial input producing a possible 4800 BPS of encoded non-return to zero (NRZ) voice data in parallel format which includes appropriate vocoder forward error correction. The 4800 BPS digital voice signal is then sent to CPU 16 where the data is digitally encrypted by DED 22 in 64 bit blocks. Next the critical control information including synchronization, command, digital coded squelch, encryption initialization, end of prologue timer, and control information forward-error correction is added to produce NRZ formatted data output from CPU 16. Various types of control information will be described below and as shown in FIGS. 6, 7 and 8. After the NRZ encrypted signal with unencrypted control information (herein designated "digitally encrypted NRZ signal") is output from CPU 16, it is then passed to USART 30 where the parallel data is converted to serial format. USART 30 then passes the serial digitally encrypted NRZ signal to modem 32 where it is modified (compressed) by a modulation technique suitable for transmission over conventional radio 12. A suitable modulation method is modified frequency modulation (MFM). Modem 32 may advantageously operate at a plurality of operating speeds in response to the command word contained in the control information, or master prologue. The resulting MFM data stream, containing unencrypted control information and modified encrypted digital signals (herein designated "modified digitally encrypted signals") is then sent via tx modem 88 to terminal B of block 62 whereby it is converted to frequency modulated (FM) or phase modulated (PM) as appropriate by modulator 44 and is then transmitted over communication channel 48.

Figure 5:
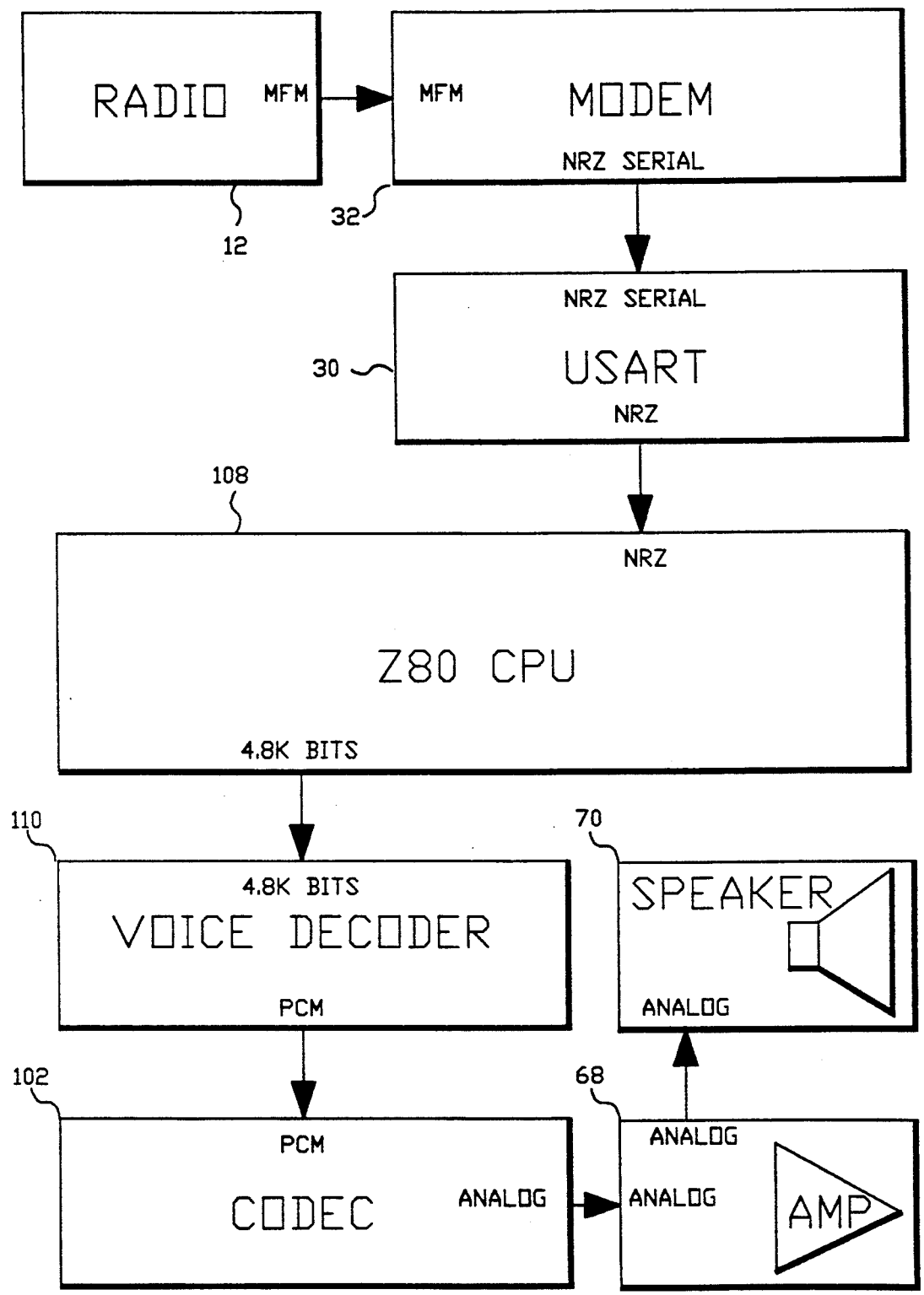
FIG. 5 is a block diagram of a reception voice process flow according to the present invention.

FIG. 5 is a block diagram illustrating the preferred method of the received digital voice decoding flow. The modified digitally encrypted signal originates from a remote radio location and is then transmitted over communication channel 48 where it is received in frequency or phase modulated format at radio 12. Modem 32 synchronizes with the received signal at approximately 3200 BPS preferred base or master prologue data rate. Modem 3 then converts the modified digitally encrypted signal to a serial digitally encrypted NRZ signal at a plurality of BPS rates depending upon the command word received in the master prologue. Also, modem 32 preferably contains soft decision circuitry (not shown) that subsequently advises the voice decoder 110 and CPU 16 of the probability of correct reception of each bit.

The digitally encrypted NRZ serial bit stream from modem 32 is then routed to USART 30 where it is then converted from serial format to parallel format. The output of USART 30 is then routed to CPU 16 where control information is stripped from voice and/or data information and the voice and/or data is decrypted by DED 22. The decrypted voice data is then sent to voice decoder block 110 within voice processor 18 where it is decoded and converted into PCM. The PCM is then sent to the Codec 102 where the PCM serial data stream is converted into analog, routed through amplifier 68 and resultant sound waves are produced at speaker 70.

FIG. 6 is a block diagram illustrating an exemplary master prologue 112. A command word links master prologue 112 with the voice data block (shown in FIG. 7) and/or secondary command/data block as (shown in FIG. 8). Master prologue 112 contains control information wherein at least one set of each type must be interpreted error-free by the receiving unit(s). Therefore, the preferred method of transmitting the master prologue is: 1) transmit the lowest possible BPS rate for data reliability, 2) contain enough redundant information and error-correction to avoid an average 45 ms. deep fade often associated with land mobile radio channel environments, and 3) make the master prologue of short enough duration to be repeatable at least two times per second for re-sync and late entry while not causing a break in the encrypted voice.

As shown in FIG. 6, master prologue 112 is transmitted at a preferred rate of 3200 BPS (3200 baud) and provides at least one of each 8 bit word of control information 114 to be separated by 52.5 ms. from the farthest identical 8 bit word. Master prologue 112 functions to identify each new transmission block transmitted over communication channel 48. A 3 db BER improvement from the preferred master prologue BPS rate to the voice block BPS rate typically allows at least one set of critical control information be reconstructed error-free when the voice data is intelligible.

Informal tests using the GLB Electronics, model no. HSM-5 modem have shown the reconstruction to be reliable at or near conventional radio sensitivity of 13 db signal+noise/noise (s+n/n). With the error correction techniques of cycle redundancy checks, 8 bit matrix extraction, and soft decision, the receiving device 10 should extract one set of error-free information with one 45 ms. fade occurring totally within the 100 ms. master prologue.

Master prologue 112 contains several blocks of control information 114 including information for (i) synchronizing data flow (sync), (ii) transferring a command word (command), (iii) determining which units are authorized to decrypt the message, (iv) activating repeaters, (v) instructing the receiving unit(s) which cryptographic key to use (DCS), (vi) starting the encryption process by transmitting an initialization vector (IV), and (vii) allowing adequate time for the transmitting and receiving units to alter the modem speed and stabilize by the prologue timer (EOP), if so instructed by the command word. Sync, command, DCS, IV and EOP are shown in blocks 114 of FIG. 6. Reference number 116 of FIG. 6 represents the number of bits assigned to the various blocks within the master prologue 112. The first 40 bits are used to allow the receiving unit to synchronize to the transmitting unit. The synchronizing block (sync) consists of five 8 bit words, having the hexadecimal values of 7E, 7E, 7E, 7E, and 00. The preferred modem synchronizes on any three MFM encoded bits patterned 101. Hexadecimal 7E has an NRZ value of 01111110. The six each 1's are encoded (compressed or modified) into MFM as a 101 pattern. The MFM modem synchronizes on the 101 pattern then outputs NRZ 01111110 pattern for the USART to synchronize. Only one of four hexadecimal words 7E must be received for the system to achieve synchronization. The word 00 marks the end of the sync block. The next 264 bits are divided into three blocks consisting of 8 bits of command data, 8 bits of DCS data, 72 bits of IV data including an 8 bit cycle redundancy check (CRC) for a total of 88 bits. The command, DCS, AND IV blocks are transmitted three times each at a low BPS rate, in the same order, to allow separation of at least one each 8 bit word beyond the average fade of 45 ms and for data reliability. The 8 bit CRC is used to detect errors in the command DCS and IV blocks. The remaining 16 bits at the end of prologue timer (EOP) are used to allow the transmitting and the receiving units to change speeds and stabilize, if so instructed by the command block.

"Late entry" to a secure conversation is needed when an authorized remote unit does not receive one set of error-free critical control information from the sender's initial master prologue. Device 10 makes a late entry possible each time the master prologue is re-transmitted with the same reliability. The total time frame of the master prologue is 100 ms., which during a modified digitally encrypted voice transmission is repeated two times per second. Therefore, an authorized remote unit that has not gained one set of the control information error-free, can enter late twice per second to decrypt the remaining portion of the transmission.

FIG. 7 is an exemplary block diagram of voice block 120 which is used to achieve voice block synchronization (vsync), encrypted voice data transfer (voice) and an end of voice transmission (VEOT). FIG. 7 illustrates data transmitted at the BPS rate required by voice coder 104, including necessary forward-error correction, to achieve commercial quality voice reproduction at the receive end. Using the preferred IMBE or STC Vocoder with forward-error correction to attain intelligibility in a 5% to 8% BER, transmission of 4800 BPS is needed. Since control information must also be transmitted, the required 4800 BPS is transmitted at 6400 BPS rate, thus transmitting one second of real-time voice in 800 ms, divided into two 400 ms blocks. This 800 ms voice block transmission method allows 200 ms to transmit the master prologue twice per second for resynchronization, late entry, etc. without causing the listener to hear a break in the voice.

The preferred data format shown in FIG. 7 divides the voice block 120 into 75 ms frames (100 ms real-time voice). Assuming the master prologue was properly received, interlacing sync markers at selected intervals throughout voice block 120 allows for re-synchronizations, or re-entries to occur within the voice block. Thus, should an average 45 ms. deep fade cause the modem or USART to lose synchronization during the voice block 120, only a portion of the voice would be lost, versus the entire 400 ms. block (500 ms real-time) if no interlaced sync markers were used.

The first 48 bits of voice block 120 are vsync. VSYNC preferably consists of six 8 bit words with a hexadecimal value of E7, E7, E7, E7, E7, and 00. The synchronization pattern is similar to the synchronization block of master prologue 112. The next 480 bits of data begins the encrypted voice data, which consists of 5 sets of 96 bits of voice data. The next 24 bits of data are the rsync. RSYNC is used for voice block re-entry. If the vsync or one of the rsyncs are lost, the receiving modem and/or USART can use rsync for re-synchronization to decode the remaining portion of the voice block 120. The next 480 bits of data are the second voice data frame, which consists of five sets of 96 bits of voice data.

This sequence of rsync followed by voice data frames is repeated a total of four times (five times total) within the 400 ms allowed for voice block 120. The next 16 bits are VEOT. VEOT is used to mark the end of the transmission sequence. The VEOT also allows time for the transmitting and receiving units to change speeds, if so instructed by the command word.

VSYNC, voice, rsync, voice, rsync, voice, rsync, voice, rsync, voice and VEOT are shown by reference numeral 122, and the representative number of bits for each frame are shown by reference numeral 124. Each frame, and corresponding bits occupy time as indicated by reference numeral 126. The total time required to transmit voice block 120 is 400 ms, which outputs 500 ms voice to the listener. It should be noted that any unit which is lost and is unable to reenter during rsync, is reset to the master prologue BPS rate (base BPS rate) for re-synchronization and cryptographic re-initialization by one of the counter timer controllers (CTC) within CPU 16.

FIG. 8 is a block diagram of an exemplary secondary command/data block 212 which may be used to perform the special functions of device 10 other than the preferred method of real-time voice encryption. Activating the secondary command/data block is through front panel controls 28, auxiliary data port 34, or optional DTMF decoder 36. Therefore, either local or remote activation of secondary command/data block 212 is possible.

Generally, a master prologue 112 will precede a secondary command/control block 212 to achieve synchronization and encryption initialization. However, it is not necessary that every master prologue 112 precede every secondary command/data block 212. For instance, device 10 could be modified to include a different voice coder, encryption algorithm, and/or modulation technique for compatibility with another digital format such as APCO Project 25 or federal standard 1024 or other digital formats. In this instance, the operator would instruct CPU 16 to operate in accordance with the command word given which changes device 10 to function entirely different through conventional radio 12. It also may not be necessary, or desired, that each device 10 unit perform all of the functions available.

The functions of secondary command/data block 212 are intended to be as flexible in format and length as possible and are only limited by the number of different command words that can be created. System 10 could use any length of command words, but the preferred length of the command word is 8 bits. There are 256 possible functions that can be performed by the secondary command/data block 212 when using 8 bit command words. The 256 command variations are believed to allow for sufficient future expansion of device 10 capability which can include (i) identifying and transferring differing types of digital data, such as DTE ASCII data, fax data, digitized compressed video, voice mail, delayed message (talk and run), or combining real-time voice and data during single transmissions; (ii) providing end of transmission markers, such as ending voice transmissions with automatic number identification (ANI); (iii) selecting speeds and/or protocols such as selecting a particular BPS rate, selecting modulation techniques, or converting to an open architecture data format, such as the federal standard 1024 or APCO Project 25 digital voice encryption format; (iv) programming units of device 10 from remote locations e.g., re-set master keys or DCS codes sent over the transmission channel; and (v) requesting a unit to perform a particular function such as erasing memory, responding with status, or transferring daily reports.

Secondary command/data block 212 shown in FIG. 8 is an example at 3200 BPS of the format used to transfer a packet of data from one unit to another through the auxiliary data port 34. This format consists of methods to achieve synchronization (ssync), transfer command word (command), identify transmitting unit (ANI), select receiving unit (address), transfer data (data), and provide an end of transmission (SEOT) marker.

The illustrated ssync consists of 8 bytes of hexadecimal data E7, E7, E7, E7, E7, E7, E7, 00. The E7 versus 7E in master prologue 112 identifies to the receiving unit that a secondary command/data block 212 is being transmitted. The preferred modem synchronizes on any three MFM encoded bits patterned 101. Hexadecimal 7E has an NRZ value of 10000001. The six 0's, when encoded or modified into MFM, produce a 101 pattern. The MFM modem synchronizes on the 101 pattern then outputs NRZ 10000001 for the USART to synchronize. Only one of seven hexadecimal words E7 must be received for the system to synchronize. The word 00 marks the end of the ssync block. The next 32 bits of data are the command data, which consists of four 8 bit bytes of data and instructs the receiving unit how to process the information being transmitted. The next 72 bits of data are the address and CRC check for both the command and address blocks. The address is used to select one of a plurality of receiving units. The CRC validates the data and initializes a data recovery, if necessary. The next 72 bits of data are the ANI and a CRC check. The ANI is used to identify the transmitting unit, with the CRC used to validate the data and initialize a data recovery, if necessary.

The sequence of 64 bit E7/00 ssync, 32 bit command, 72 bit address with CRC, and 72 bit ANI with CRC are repeated to separate each 8 bit data word beyond the average 45 ms fade as discussed above. The illustrated next 256 bits are used to transfer sixteen 8 bit bytes of data, of which is determined by the command word. The final 16 bits are SEOT. SEOT is used to mark the end of the transmission sequence. SEOT also allows time for the transmitting and receiving units to change speeds, if so instructed by the command word.

SYNC, command, address, ANI, data and SEOT are shown in FIG. 8 by reference numeral 214, and the representative number of bits for each block are shown by reference numeral 216. Each block, with corresponding bits, requires a certain amount of transmission time as indicated by reference numeral 128 at the illustrated rate of 3200 BPS. The total transmission time for the exemplary secondary command/data block 212 shown is 235 ms.

FIG. 9 is a table showing the pin assignments of auxiliary RS232 serial port connector, which is preferably located on the Outside of device 10 at least at each mobile or base station unit. This connector uses the V.24 standard nine pin "AT" style pin out, with one exception: pin 9 is an output which indicates whether or not the secure mode is selected by device 10. This connector, model no. DB9-S, manufactured by Cannon Inc. is shielded through the use of ferrite beads incorporated into device 10.

FIG. 10 shows examples (designated as reference number 194) of some of the 256 command words available for use in device 10. The description 192 of each command word and the designation of whether the command word is used in the master prologue 112 or the secondary command/data block 212 is also shown. By using command words in the master prologue 112 and secondary command/data block 212, device 10 can be used for more than one application, i.e., for more than merely voice encryption.

FIG. 11 illustrates a repeater communications controller device (RCC) of the present invention. RCC, shown as device 200, is preferably used with and connected to frequency modulated (FM) radio repeaters, but can also be used on conventional phase modulated (PM) and trunked radio repeaters. A repeater is generally known in the art as a circuit which intercepts and retransmits a signal to provide long-distance communications. Repeaters are often used at the very high, ultra-high and microwave frequencies. Repeaters are especially useful for mobile operation. The effective range of a mobile station is greatly enhanced by a repeater. A radio repeater consists of an antenna, a receiver, a transmitter, and an isolator. The transmitter and receiver are operated at slightly different frequencies. The separation of the receiver and transmitter frequencies allows the isolator to work at maximum efficiency, preventing undesirable feedback. Repeaters are often placed aboard satellites. All active communications satellites use repeaters. A satellite in a synchronous orbit can provide coverage over approximately 30% of the globe.

Device 200 includes a repeater interface 210 which is wired to the inside of or connected to a conventional radio repeater 212. As described above, repeater 212 can be used to receive and retransmit analog voice (clear) information to increase the signal power and/or change the radio frequency. Repeater 212, being of conventional design, can be upgraded to include receiving and re-transmitting modified digitally encrypted signals transmitted and received as described above. The necessary hardware to accomplish this task is described as the RCC device 200 which includes blocks 202 - 210 and 214, as shown in FIG. 11.

Repeater interface 210 is used to couple device 200 with radio repeater 212 such that analog voice (clear) or modified digitally-encrypted signal (secure) received by radio repeater 212 is passed through the repeater interface 210 to the RX (receive) modem 206. The repeater interface 210 has a direct connection from radio repeater 212 to RX modem 206 in order to allow the RX modem 206 to continually monitor the received information for a modified digitally encrypted signal. The design of repeater interface 210 allows device 200 to accommodate a large variety of radio repeater 212 interface requirements. Thus, radio interface 210 allows the incorporation of device 200 to upgrade substantially any conventional radio repeater system to process the modified digitally encrypted signals of the present invention.

Although numerous designs can be implemented for repeater process control, device 200 can be suitably built around the Zilog Corporation Z80 based processor, model no. Z84C1510VEC intelligent peripheral controller (IPC), designated as reference number 214. The Z80 CPU 214 has integrated into a single die numerous functions which reduce the package count of the overall device 200. It should be noted that an equivalent number of single function integrated circuits or discrete components can be substituted for Z80 CPU 214, and still fulfill the object of the present invention.

CPU 214 includes hardware necessary for various applications including: a central processor unit (CPU), clock oscillator (OSC), watchdog timer (WDT), four channel counter timer controllers (CTC), two separate universal synchronous asynchronous receivers/transmitters (USART) and two separate eight bit parallel input/output (PIO) controllers. Within CPU 214, USART A is used to communicate to the RX (receive) modem 206 and USART B is used to communicate with TX (transmit) modem 208. The two PIO's are connected to the repeater interface 210 for control and status information. The WDT monitors the activity of the CPU 214 and resets device 200 should CPU 214 get lost.

CPU 214 SIO "A" USART is used to communicate with the RX modem 206, which is used to demodulate (decompress) the modified digitally encrypted signal received by the radio repeater 212, into digitally encrypted NRZ serial format. RX modem 206 can be, but is not limited to a half duplex receiver demodulator.

CPU 214 SIO "B" USART is used to communicate with the TX modem 208, which is used to modulate (re-compress) the digitally encrypted NRZ signals into modified digitally encrypted signals for input into the modulator of radio repeater 212 for retransmission. TX modem 208 can be, but is not limited to a half duplex transmitting modulator. It should be noted that the RX modem 206 and the TX modem 208 could be replaced by a single full duplex modem, which could require a single USART from CPU 214. This would allow CPU 214 SIO "B" USART to be used for other purposes, namely, that of a programing mechanism for device 200. A suitable programming mechanism includes data collection necessary for billing purposes, etc.

SRAM 202 contains the data storage medium used in device 200. SRAM 202 may consist of at least one device with a total of 32,768 eight bit data addresses. The SRAM 202 is addressable from 32,768 to 65,536 and is used to store temporary variables used in the process of device 200.

PROM 204 contains the program data storage medium used in device 200. The PROM 204 may consist of at least one device with a total of 32,768 eight bit data addresses. The PROM 204 is addressable from 0 to 32,767 and is used to store the programming required to operate the device 200. It should be noted that there are various other devices that can satisfy the requirements of PROM 204.

Figure 12:
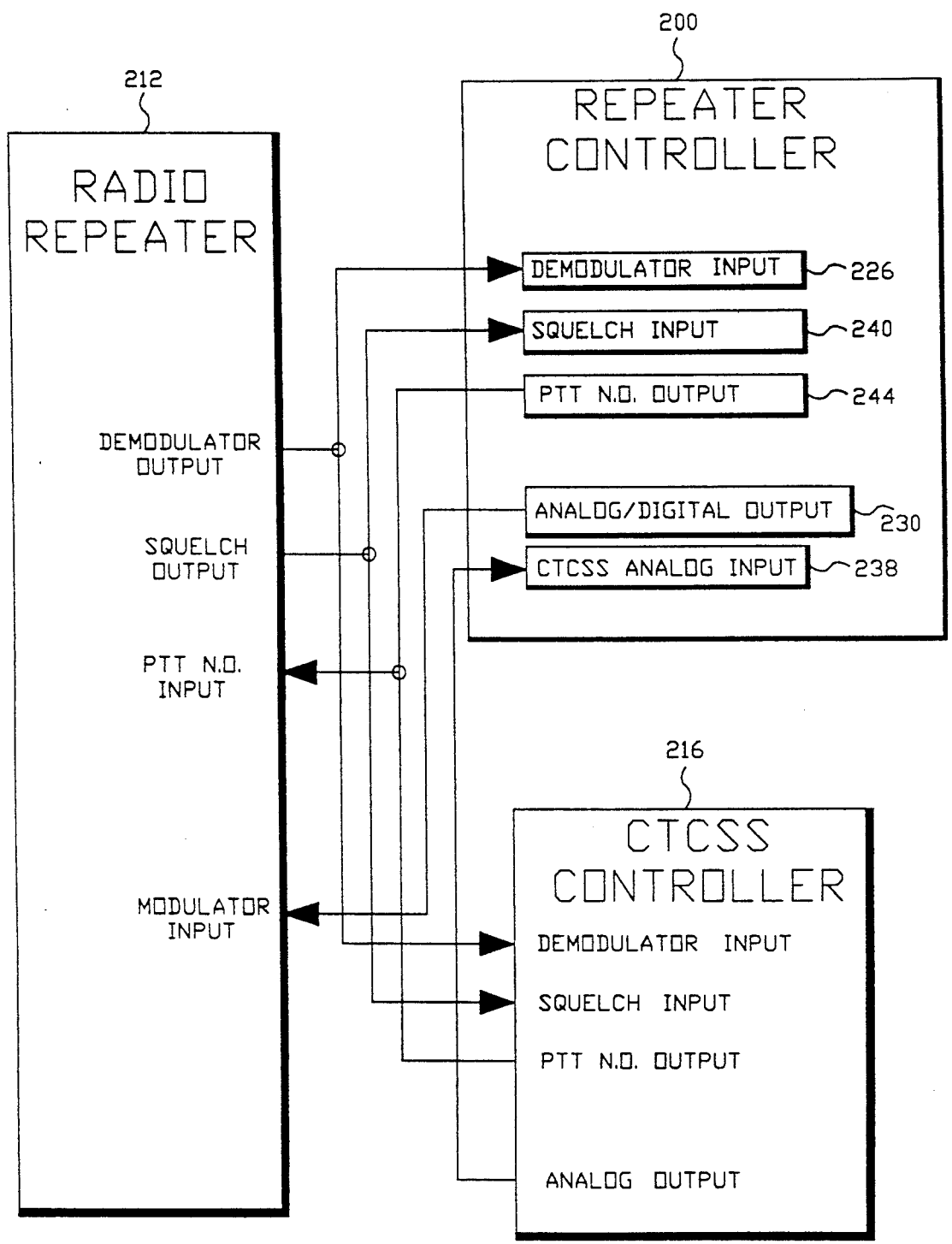
FIG. 12 is a block diagram of an interface between a repeater communications controller of the present invention and a conventional repeater.

FIG. 12 illustrates a typical interfacing configuration for device 200. Typical conventional repeater systems consist of a radio repeater 212 and a CTCSS controller 216. When RCC is installed, the radio repeater 212 demodulator output is coupled to the demodulator input 226 of the device 200 and demodulator input of the CTCSS controller 216. The radio repeater 212 squelch output is coupled to both the squelch input 240 of the device 200 and to the squelch input of the CTCSS controller 216. The radio repeater 212 PTT N.O. (normally open) input is coupled to the PTT N.O. output (244) of the device 200 and the CTCSS controller 216. Thus, the PTT N.O. input from radio repeater 212 allows either device 200 or CTCSS controller 216 to activate the transmitter of radio repeater 212. The path from the CTCSS controller 216 analog output to radio repeater 212 modulator input is rerouted through CTCSS analog input 238 of device 200. Device 200 analog/digital output 230 is then connected to radio repeater 212 modulator input. When conventional radio repeater 212 does not use a CTCSS controller, the CTCSS analog input 238 on device 200 is connected directly to radio repeater 212 demodulator output.

Figure 13:
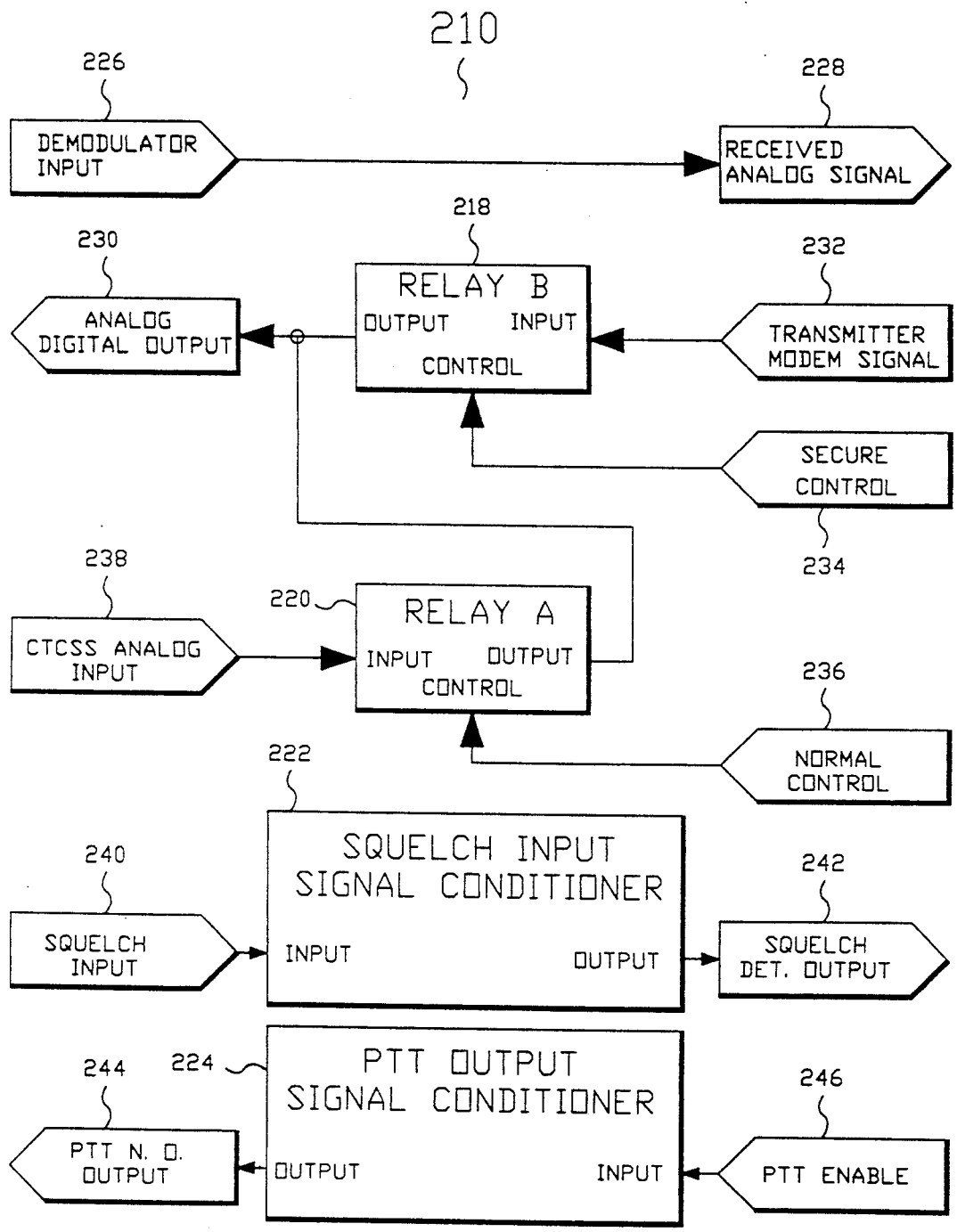
FIG. 13 is a block diagram of a receive and transmit signal process flow between a repeater communications controller of the present invention and a conventional repeater.

FIG. 13 illustrates the signal flow of repeater interface 210 contained within device 200. The repeater interface 210 consists of relay A 220, relay B 218, a squelch input signal conditioner 222, a PTT output signal conditioner 224, and the demodulator input 226 which is directly connected to received analog signal 228.

The repeater interface 210 provides all of the interface functions needed to interface the device 200 to a conventional radio repeater 212 system. The analog/digital output 230, can be selectively coupled to either the transmitter modem signal 232 through relay B or to the CTCSS analog input 238 through relay A as instructed by the control signals, secure control 234 or normal control 236. The control signals secure control 234 and normal control 236 are directly controlled by Z80 CPU 214 PIO-B outputs, which are selectively controlled by the RX modem 206 input signal. If the signal received by the RX modem 206 is voice analog then the normal control 236 is active and the secure control 234 is inactive, but if the signal is a modified digitally encrypted signal of the present invention, the normal control 236 is inactive and the secure control 234 is active. When the normal control 236 is active, relay A 220 input and output are directly coupled and, conversely, when the normal control 236 is inactive, the relay A 220 input and output are isolated. When the secure control 234 is active, relay B 218 input and output are directly coupled and, conversely, when the secure control 234 is inactive the Relay B 218 input and output are isolated. The Z80 CPU 214 does not allow the normal control 236 and the secure control 234 to be active at the same time.

The squelch input signal conditioner 222 is used to isolate and/or interface the squelch input 240 to squelch detected output 242. The squelch input signal conditioner allows radio repeater 212 squelch output to connect to PIO-A of Z80 CPU 214 (not shown). The PTT output signal conditioner 224 is used to isolate and/or interface the PTT enable 246 to PTT N.O. output 244. The PTT output signal conditioner 224 allows PIO-B of Z80 CPU 214 to connect to PTT N.O. input 244 of radio repeater 212 (not shown).

The foregoing description of the present invention has been directed to particular preferred embodiments. It will be apparent, however, to those skilled in the art that modifications and changes to the present system may be made without departing from the scope and spirit of the invention. For example, several voice coding techniques, bit rates, frequency bandwidths, processor architectures, encryption algorithms (or lack thereof), modulation techniques and/or data formats, etc. can be utilized and configured in any fashion as long as the desired results of the present invention is obtained. Therefore, it is the applicants' intention in the following claims to cover all such equivalent modifications and variations which fall within the true spirit and scope of this invention.

What is claimed is:

1. An improved digital encryption device comprising:
   a radio interface connected to a conventional radio and adapted to receive a non-secure voice signal;
   a codec selectively coupled to said radio interface for receiving said non-secure voice signal and for converting said signal into a pulse code modulated signal;
   a signal processor adapted for converting said pulse code modulated signal into a digitally encrypted NRZ signal; and
   means for modulating said digitally encrypted NRZ signal on a carrier signal, said modulated carrier signal occupying a necessary bandwidth approved for channels spaced 15 KHz to 25 KHz apart.

2. The improved digital encryption device as recited in claim 1, wherein said modulated carrier signal necessary bandwidth is greater than 11.4 KHz.

3. The improved digital encryption device as recited in claim 1, wherein said modulating means comprises a modem for modified frequency modulating said digitally encrypted NRZ signal to produce a modified digitally encrypted signal having a 300 Hz to 3200 Hz passband.

4. The improved digital encryption device as recited in claim 1, wherein said modulating means comprises a modem for continuous phase modulating said digitally encrypted NRZ signal to produce a modified digitally encrypted signal.

5. The improved digital encryption device as recited in claim 1, wherein said signal processor comprises a voice coder means for compressing said pulse code modulated signal to a rate substantially equal to 4800 bits per second.

6. The improved digital encryption device as recited in claim 1, further comprising a communication channel capable of receiving a modified said digitally encrypted NRZ signal at a rate of at least 2 bits/Hz.

7. An improved digital encryption device comprising:
   a radio interface connected within a conventional radio and adapted to receive a non-secure voice signal;
   a codec selectively coupled to said radio interface for receiving said non-secure voice signal and for converting said signal into a pulse code modulated signal;
   a signal processor adapted for converting said pulse code modulated signal into a digitally encrypted NRZ signal;
   a first modem for modified frequency modulating said digitally encrypted NRZ signal to produced a modified digitally encrypted signal occupying a passband between 300 Hz to 3200 Hz; and
   a second modem for modulating a carrier signal with said modified digitally encrypted signal, said modulated carrier signal occupying a necessary bandwidth approved for channels spaced 15 KHz to 25 KHz apart.

8. The improved digital encryption device as recited in claim 7, wherein said digitally encrypted NRZ signal comprises a DES-encrypted signal.

9. The improved digital encryption device as recited in claim 7, further comprising a communication channel capable of receiving said modified digitally encrypted signal at a rate of at least 2 bits/Hz.

10. The improved digital encryption device as recited in claim 7, further comprising means for transmitting at a rate of at least twice per second a voice block of said modified digitally encrypted signals preceded in each transmission by a master prologue block.

11. The improved digital encryption device as recited in claim 10, wherein said first modem is selectively capable of transmitting a plurality of bits within said voice block at a faster ate than a plurality of bits within said master prologue.

12. The improved digital encryption device as recited in claim 10, wherein said voice block comprises a plurality of resynchronization data frames of bits interlaced between a plurality of voice date frames of bits.

13. The improved digital encryption device as recited in claim 1, further comprising means for transmitting at a rate of at least twice per second a secondary command data block of said modified digitally encrypted signals preceded in each transmission by a master prologue block.

14. A communication system for providing secure communication over a communication channel comprising:
- a conventional radio capable of transmitting and receiving a non-secure voice signal modulated on a carrier signal, said modulated carrier signal occupying a necessary bandwidth approved for channels spaced 15 KHz to 25 KHz apart;
- a radio interface unit connected to said radio, said interface comprising:
  - a codec selectively coupled to receive said non-secure voice signal and convert said non-secure voice signal into a pulse code modulated signal;
  - a signal processor adapted for compressing said pulse code modulated signal into a transmitted digitally encrypted NRZ signal;
  - a first modem for modulating said digitally encrypted NRZ signal to produce a transmitted modified digitally encrypted signal;
  - a second modem for modulating said carrier signal with said transmitted modified digitally encrypted signal to produce said modulated carrier signal;
- a communication channel for receiving said modulated carrier signal;
- said radio interface unit further comprising:
  - said second modem for receiving a modulated carrier signal from said communication channel and for converting said modulated carrier signal into a received modified digitally encrypted signal;
  - said first modem for receiving said received modified digitally encrypted signal and for converting said received modified digitally encrypted signal into a received digitally encrypted NRZ signal;
  - said signal processor adapted for converting said received digitally encrypted NRZ signal into decrypted pulse code modulated digital signals; and
  - said codec adapted for converting said decrypted pulse code modulated digital signals to said non-secure voice signals.

15. The communication system as recited in claim 14, wherein said communication channel comprises a telephone line.

16. The communication system as recited in claim 14, further comprises a universal synchronous/asynchronous receiver/transmitter having at least one port for receiving auxiliary data to be transmitted as said transmitted modified digitally encrypted signal over said communication channel.

17. The communication system as recited in claim 14, wherein said first modem comprises means for modifying and for inputting said transmitted digitally encrypted NRZ signal into said second modem in modified frequency modulation format, wherein said transmitted modified digitally encrypted signal comprises a passband of 300 Hz to 3200 Hz.

18. The communication system as recited in claim 14, wherein said first modem comprises means for modifying and inputting said transmitted digitally encrypted NRZ signal into said second modem in continuous phase modulation format.

19. The communication system as recited in claim 14, wherein said transmitted and received digitally encrypted NRZ signal comprises a DES-encrypted signal.

20. The communication system as recited in claim 14, further comprising means for transmitting at a rate of at least twice per second a voice block of said transmitted modified digitally encrypted signal preceded in each transmission by a master prologue block.

21. The communication system as recited in claim 14, further comprising means for transmitting at a plurality of bit rates per second a secondary command data block of said transmitted modified digitally encrypted signal in response to a command word contained with a master prologue block.

22. An improved system for transmitting secure signals through a repeater, the improved system comprising:
- a conventional repeater;
- a repeater communication controller physically connected to said conventional repeater to selectively control said conventional repeater during reception and retransmission of digitally encrypted signals, said repeater communication controller comprising:
  - a receive modem for demodulating a received modified digitally encrypted signal to produce a digitally encrypted NRZ signal;
  - means for error-correcting unencrypted control information within said digitally encrypted NRZ signal; and
  - a transmit modem for modulating error-corrected said digitally encrypted NRZ signal to produce a transmitted error-corrected modified digitally encrypted signal.

23. The improved system as recited in claim 22, wherein said received modified digitally encrypted signal and said transmitted error-corrected modified digitally encrypted signal each having a 300 to 3200 Hz passband.

24. The improved system as recited in claim 22, wherein said repeater communication controller is connected to a communication channel, said communication channel is adapted to receive a carrier signal modulated by a modified digitally encrypted signal.

25. A method of transmitting and receiving encrypted voice communication signals using a conventional radio, comprising:
- encoding, at a bit rate of 4800 BPS and less, a transmitting non-secure voice communication signal into a transmitting digital signal;
- encrypting said transmitting digital signal into a transmitting digitally encrypted NRZ signal;
- modifying said transmitting digitally encrypted NRZ signal into a modified digitally encrypted signal;
- modulating a carrier signal with said modified digitally encrypted signal, said modulated carrier signal occupying a necessary bandwidth approved for channels spaced 15 KHz to 25 KHz apart;
- transmitting said modulated carrier signal over a communication channel;
- demodulating said modified digitally encrypted signal from said modulated carrier signal;
- demodifying said modified digitally encrypted signal into a receiving digitally encrypted NRZ signal;
- decrypting said receiving digitally encrypted NRZ signal to produce a receiving digital signal; and
- decoding, at a bit rate of 4800 BPS and less, said receiving digital signal to produce a receiving non-secure communication signal.

26. The method as recited in claim 25, wherein said modulating step further comprises modified frequency modulating a digitally encrypted NRZ signal to produce said modified digitally encrypted signal, wherein said modified digitally encrypted signal occupies a 300 Hz to 3200 Hz passband.

27. An improved digital encryption device comprising:

a radio interface connected to a conventional radio and adapted to receive a non-secure voice signal;

a codec selectively coupled to said radio interface for receiving said non-secure voice signal and for converting said signal into a pulse code modulated signal;

a signal processor adapted for converting said pulse code modulated signal into a digitally encrypted NRZ signal; and means for modulating said digitally encrypted NRZ signal on a carrier signal, said modulated carrier signal is occupying a necessary bandwidth approved for channels spaced greater than 11.4 KHz apart.

* * * * *

UNITED STATES PATENT AND TRADEMARK OFFICE
CERTIFICATE OF CORRECTION

PATENT NO. : 5,305,384
DATED : April 19, 1994
INVENTOR(S) : Ashby, et al.

It is certified that error appears in the above-indentified patent and that said Letters Patent is hereby corrected as shown below:

Col. 22, line 40, after "Modem", please delete "3" and substitute therefor --32--.

Col. 26, line 46, after "located on the", please delete "Outside" and substitute therefor --outside--.

Claim 7, col. 30, line 34, after "NRZ signal to", please delete "produced" and substitute therefor --produce--.

Claim 11, col. 30, line 57, after "at a faster", please delete "ate" and substitute therefor --rate--.

Claim 13, col. 30, line 64, after "in claim", please delete "1" and substitute therefor --7--.

Signed and Sealed this

Thirteenth Day of September, 1994

Attest:

BRUCE LEHMAN

Attesting Officer        Commissioner of Patents and Trademarks